US006998801B2

(12) United States Patent
Kurosawa et al.

(10) Patent No.: US 6,998,801 B2
(45) Date of Patent: Feb. 14, 2006

(54) MOTOR DRIVE DEVICE AND MOTOR DRIVE INTEGRATED CIRCUIT DEVICE

(75) Inventors: Minoru Kurosawa, Takasaki (JP); Yasuhiko Kokami, Takasaki (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 11/059,649

(22) Filed: Feb. 17, 2005

(65) Prior Publication Data

US 2005/0189891 A1   Sep. 1, 2005

(30) Foreign Application Priority Data

Feb. 26, 2004 (JP) ............................. 2004-050646
Nov. 15, 2004 (JP) ............................. 2004-329961

(51) Int. Cl.
*H02P 5/06* (2006.01)
*G11B 15/46* (2006.01)

(52) U.S. Cl. ...................... 318/254; 318/439; 318/599; 318/560; 360/73.03

(58) Field of Classification Search ................ 318/138, 318/139, 245, 254, 439, 560, 561, 599; 360/73.03
See application file for complete search history.

(56) References Cited

U.S. PATENT DOCUMENTS

| | | | |
|---|---|---|---|
| 5,661,382 A * | 8/1997 | Enami et al. ................ 318/439 |
| 6,771,033 B1 * | 8/2004 | Kokami et al. .............. 318/138 |
| 6,806,663 B1 * | 10/2004 | Kusaka et al. .............. 318/254 |
| 6,812,667 B1 * | 11/2004 | Yasohara et al. ........... 318/599 |
| 6,900,604 B1 * | 5/2005 | Kokami et al. .............. 318/254 |
| 2002/0181137 A1 * | 12/2002 | Kimura et al. ........... 360/73.03 |
| 2004/0007998 A1 * | 1/2004 | Yasohara et al. ........... 318/437 |
| 2004/0108827 A1 * | 6/2004 | Kusaka et al. .............. 318/254 |
| 2004/0189221 A1 * | 9/2004 | Kurosawa et al. .......... 318/254 |
| 2005/0036228 A1 * | 2/2005 | Kimura et al. ........... 360/73.03 |
| 2005/0067986 A1 * | 3/2005 | Kurosawa et al. .......... 318/254 |

FOREIGN PATENT DOCUMENTS

JP   11069872   3/1999

\* cited by examiner

*Primary Examiner*—Paul Ip
(74) *Attorney, Agent, or Firm*—Mattingly, Stanger, Malur & Brundidge, P.C.

(57) ABSTRACT

A motor drive device which controls a spindle output predriver unit and power MOSFETs of an output stage associated with it to form a PWM signal in such a manner that a detection current formed by a DC shunt resistor and a sense amplifier and a current instruction signal coincide with each other, generates a regenerative signal obtained by giving dead times to the PWM signal, generates an energizing timing signal from the result of BEMF (back electromotive voltage) zero cross detection and generates signals for controlling on/off of power MOSFETs of three phases to thereby drive a three-phase motor, is provided with a switching characteristic adjustment unit which measures a time at which the spindle output is being transitioned and performs such feedback control that the measured time and a designated switching time coincide with each other.

20 Claims, 17 Drawing Sheets

MOTOR DRIVE DEVICE AND MOTOR DRIVE INTEGRATED CIRCUIT DEVICE

CROSS-REFERENCE TO RELATED APPLICATION

The present application claims priority from Japanese patent application Nos. 2004-050646 filed on Feb. 26, 2004 and 2004-329961 filed on Nov. 15, 2004, the content of which is hereby incorporated by reference into this application.

BACKGROUND OF THE INVENTION

The present invention relates to a motor drive device and a motor drive integrated circuit device, and to a technique effective when applied to a rotational control technique of a three-phase spindle motor for HDD (Hard Disk Driver) or the like, for example.

PWM (Pulse Width Modulation) driving has heretofore been adopted in a system for driving a spindle motor for an HDD device. In the case of the PWM driving, power consumed or used up by a transistor to be driven can greatly be reduced. However, there may be cases where noise occurs since an output voltage is transitioned between a power supply and GND at high speed, and an error rate of the HDD device is degraded. When a switching time is made slow to avoid it, a switching loss increases so that power is increased. Thus, a suitable time having taken into consideration the noise and switching loss is required as the switching time for a spindle. Incidentally, Japanese Unexamined Patent Publication No. Hei 11(1999)-69872 has been disclosed as a document related to the noise of the HDD device. A technique described in such a publication relates to a reduction in noise produced from a VCM driver that performs positional control of a magnetic head. Ones related to the noise produced upon driving of the spindle motor have not been disclosed.

SUMMARY OF THE INVENTION

An output stage circuit diagram of a drive circuit of a spindle motor discussed prior to the present invention is shown in FIG. 9. A circuit of a U phase of three phases comprising U, V and W is illustratively shown in the same drawing. The turning on/off of the upper and lower power MOSFETs M1 and M2 are controlled by XUP and UN signals. When the XUP signal is low in level, the upside power MOSFET M1 is turned on. When the signal UN is high in level, the downside power MOSFET M2 is turned on.

In order to avoid simultaneous turning on of the upside and downside power MOSFETs M1 and M2, the XUP and UN signals are respectively provided with delay times (dead times). When the UN signal is changed from the low to high levels, SW3 is turned on and SW4 is turned off so that MOSFETs M43 and M44 of a current mirror circuit are operated to charge gate capacitances Cgs2 and Cgd2 of the power MOSFET M2. When the gate-to-source voltage Vgs of the power MOSFET M2 is charged up to current that flows through the coil LU of the motor, the drive voltage U of the motor starts to change from the high level to the low level. A switching time tsr at this time is expressed in the following equation (1) assuming that a power supply voltage is VMVCM and a current mirror ratio is m;

$$tsr = Cgd2 \times VMCVM/(m \times Iref) \quad (1)$$

If the reference current Iref and the current mirror ratio m are set in accordance with the parasitic capacitance Cgd2 of the power MOSFET M2, then a desired switching time tsr can be obtained from the equation (1). This is similar even in the case of UN=high level to low level, XUP=high level to low level and low level to high level. Since a motor current is maintained under the action of each motor coil, a regenerative current flows through a body diode of a power MOSFET on the side opposite to the drive side when a power MOSFET on the drive side is turned off. Since large power is applied to the regeneration made through the body diode, a power MOSFET on the regeneration side is turned on at this time. The time tdly required to turn on the power MOSFET on the regeneration side is determined by parasitic capacitances Cgs1 and Cgd1 of power MOSs, charge and discharge currents and switching time tsr and expressed in the following equation (2):

$$tdly = tsr + (Cgs1 + Cgd1) \times VBRK/(m \times Iref) \quad (2)$$

The switching time and dead times are affected by variations in the manufacture of each power MOSFET. They are also affected by variations in reference current Iref and current mirror, temperature characteristics and a power supply voltage. Therefore, the switching time and each dead time need to have margins in consideration of variations and changes in temperature, etc., and a power loss increases. Further, when the power MOSFETs are configured as external elements, it is difficult to change the external power MOSFETs after the design of a motor driver.

An object of the present invention is to provide a motor drive device and a motor drive integrated circuit device which have achieved a reduction in power loss and a reduction in noise. The above, other objects and novel features of the present invention will become apparent from the description of the present specification and the accompanying drawings.

A summary of a representative one of the inventions disclosed in the present application will be described in brief as follows: A motor drive device which controls a spindle output predriver unit and power MOSFETs of an output stage associated with it to form a PWM signal in such a manner that a detection current formed by a DC shunt resistor and a sense amplifier and a current instruction signal coincide with each other, generates a regenerative signal obtained by giving dead times to the PWM signal, generates an energizing timing signal from the result of BEMF (back electromotive voltage) zero cross detection and generates signals for controlling on/off of power MOSFETs of three phases to thereby drive a three-phase motor, is provided with a switching characteristic adjustment unit which measures a time at which the spindle output is being transitioned and performs such feedback control that the measured time and a designated switching time coincide with each other.

A summary of a representative one of the inventions disclosed in the present application will be explained in brief as follows: There is provided a motor drive device which controls a spindle output predriver unit and power MOSFETs of an output stage associated with it to form a PWM signal in such a manner that a detection current formed by a DC shunt resistor and a sense amplifier and a current instruction signal coincide with each other, generates a regenerative signal obtained by giving dead times to the PWM signal, generates an energizing timing signal from the result of BEMF (back electromotive voltage) zero cross detection and generates signals for controlling on/off of power MOSFETs of three phases to thereby drive a three-phase motor, wherein the dead times for on/off-controlling the other of a pair of power MOSFETs comprising an upside and a downside in order to avoid simultaneous turning on of the pair of power MOSFETs in the next cycle are generated from a signal which determines on/off from a gate-to-source voltage of one of the pair of power MOSFETs and a signal for controlling on/off of such power MOSFETs.

A summary of another representative one of the inventions disclosed in the present application will be described in brief as follows: A spindle output predriver unit for performing operation control of upside and downside power MOSFETs for driving a three-phase DC motor, and a switching characteristic adjustment unit which measures a time at which the spindle output is being transitioned, and performs such feedback control that the measured time and a designated switching time coincide with each other, are formed in one semiconductor integrated circuit device. Signals for controlling on/off of the power MOSFETs of the three phases from a PWM signal formed so as to reach a desired rotational speed, a regenerative signal obtained by giving a predetermined dead time to the PWM signal, and an energizing timing signal formed from the result of zero cross detection of BEMF are transferred to the spindle output predriver unit.

Since the switching time and the dead times can be controlled in accordance with the characteristics of power MOSFETs, a reduction in noise and a reduction in power loss can be attained.

DETAILED DESCRIPTION OF THE PREFFERED EMBODIMENTS

Figure 1:
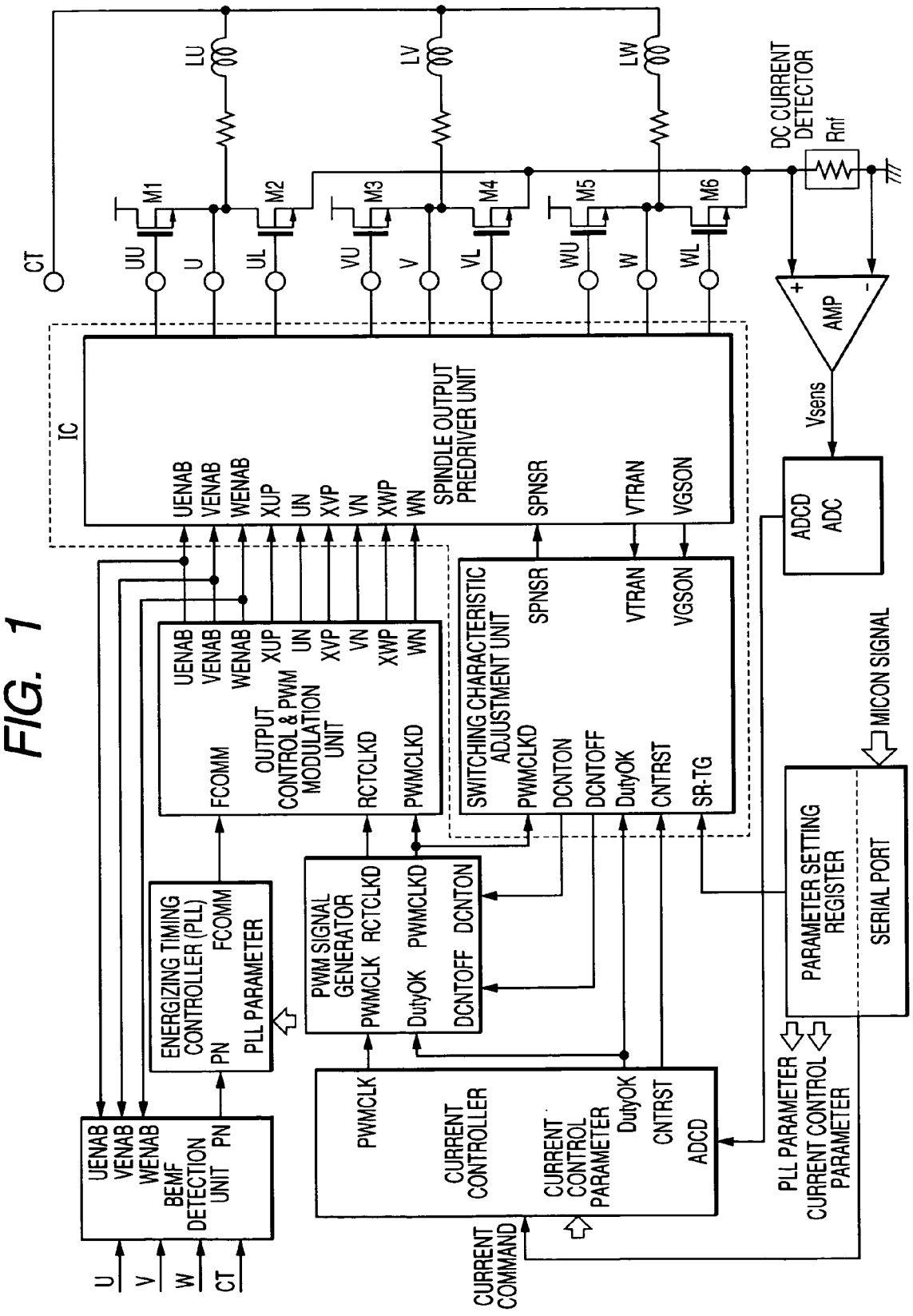
FIG. 1 is a block diagram showing one embodiment of a motor drive device according to the present invention.

A block diagram showing one embodiment of a motor drive device according to the present invention is shown in FIG. 1. Three-phase motor coils LU, LV and LW are PWM-driven by power MOSFETs M1 through M6 and a spindle output predriver unit. The spindle output predriver unit is operated with, as inputs, output control signals XUP, UN, XVP, VN, XWP and WN generated by an output control & PWM modulation unit. Also the predriver unit is operated with a current corresponding to an SPNSR signal formed at a switching characteristic adjustment unit and is capable of performing switching or adjustment to switching times.

The spindle output predriver unit is inputted with UENAB, VENAB and WENAB signals. The spindle output predriver unit forms a signal VTRAN having determined the time during which the output of a phase at which a PWM operation is being performed, is being transitioned, and a signal VGSON having determined the time during which each downside power MOSFET is on, and transfers the signals to the switching characteristic unit. The spindle output voltages U, V and W and midpoint or center voltage CT are inputted to a BEMF detection unit, where it selects a suitable phase in accordance with the UENAB, VENAB and WENAB signals formed by the output control & PWM modulation unit, thereby detecting a zero cross of BEMF.

An energizing timing controller (PLL) phase-compares the zero cross detection signal PN of BEMF formed by the BEMF detection unit and energizing timing and thereby outputs a phase switch signal FCOMM phase-controlled by a PLL loop comprising such energizing timing controller-output controller-output stage-motor-BEMF detection unit.

On the other hand, the detection of a motor drive current is performed using a DC shunt resistor Rnf. That is, the DC shunt resistor Rnf is provided between a common connecting point of downside power MOSFETs M2, M4 and M6 of the output stage and a circuit ground potential. A voltage detected by the resistor Rnf is amplified by a sense amplifier AMP, after which the result thereof is inputted to an analog-digital converter ADC, where it is converted into a digital signal. A current controller calculates an error from the A/D-converted detection value ADCD and a current instruction. Thus, such a PWM signal PWMCLK of duty that the motor drive current coincides with the current instruction by a current control loop comprising such current controller-PWM signal generator-output controller-output stage-motor-DC current detector Rnf-analog/digital converter ADC, is generated at the PWM signal generator.

The current controller outputs a Duty OK signal brought into a low level when the duty of PWM is in the vicinity of 100%. This is of a signal for preventing the PWM signal generator and switching characteristic adjustment unit from improperly operating where the width (time) of off is narrow to such an extent that the operation of a spindle output cannot be completed. This is used in an operation mode at the time that a three-phase motor is raised to a desired rotational speed at high speed immediately after power-on. The PWM signal generator generates a PWM signal PWMCLKD provided with a suitable dead time (DCNTON, DCTNOFF) obtained at the switching characteristic adjustment unit, and a regenerative signal RCTCLKD for controlling a regenerative current from the pulse width modulation signal PWMCLK obtained by the current control. When the Duty OK signal is low in level, the regenerative signal RCTCLKD is fixed to the low level so that an on operation on the regeneration side is not performed. The output control & PWM modulation unit generates output control signals XUP, UN, XVP, VN, XWP, WN and UENAB, VENAB and WENAB, using the phase switch signal FCOMM obtained by the PLL control and the PWM signals PWMCLKD and RCTCLKD obtained by the current control.

In order to reduce noise, the switching characteristic adjustment unit provided according to the present invention adjusts SPNSR in such a manner that transition time coincides with a target value SR-TG, in accordance with the signal VTRAN having determined the time during which the output of the phase at which the PWM operation is being done, is being transitioned. In order to reduce reactive power, the switching characteristic adjustment unit generates suitable dead time information (DCNTON, DCNTOFF) from the signal VGSON having determined the time during which each downside power MOSFET is on, and the PWM signal PWMCLKD. However, when the Duty OK signal is low in level, the switching characteristic adjustment unit does not update the dead time (DCNTON, DCNTOFF).

Interfacing to a control device such as a micon (microcomputer) is performed in a serial port. Various parameters such as the current instruction and current control of the current controller, PLL of the energizing timing controller, the switching time target value (SR-TG) of the switching characteristic adjustment unit, etc. are set by a register.

In the embodiment shown in FIG. 1, the spindle output predriver unit and switching characteristic adjustment unit indicated by a dotted line are constituted of one semiconductor integrated circuit device IC. In such a configuration, the power MOSFETs M1 through M6 of the output stage and other circuits are configured by a semiconductor integrated circuit device and constituted as a multichip module in which they are mounted in one package. As an alternative to such a configuration, they may be constituted of a one-chip semiconductor integrated circuit device except for the power MOSFETs M1 through M6 of the output stage. Alternatively, they may be configured of a one-chip semiconductor integrated circuit device inclusive of the power MOSFETs M1 through M6 of the output stage.

Figure 2:
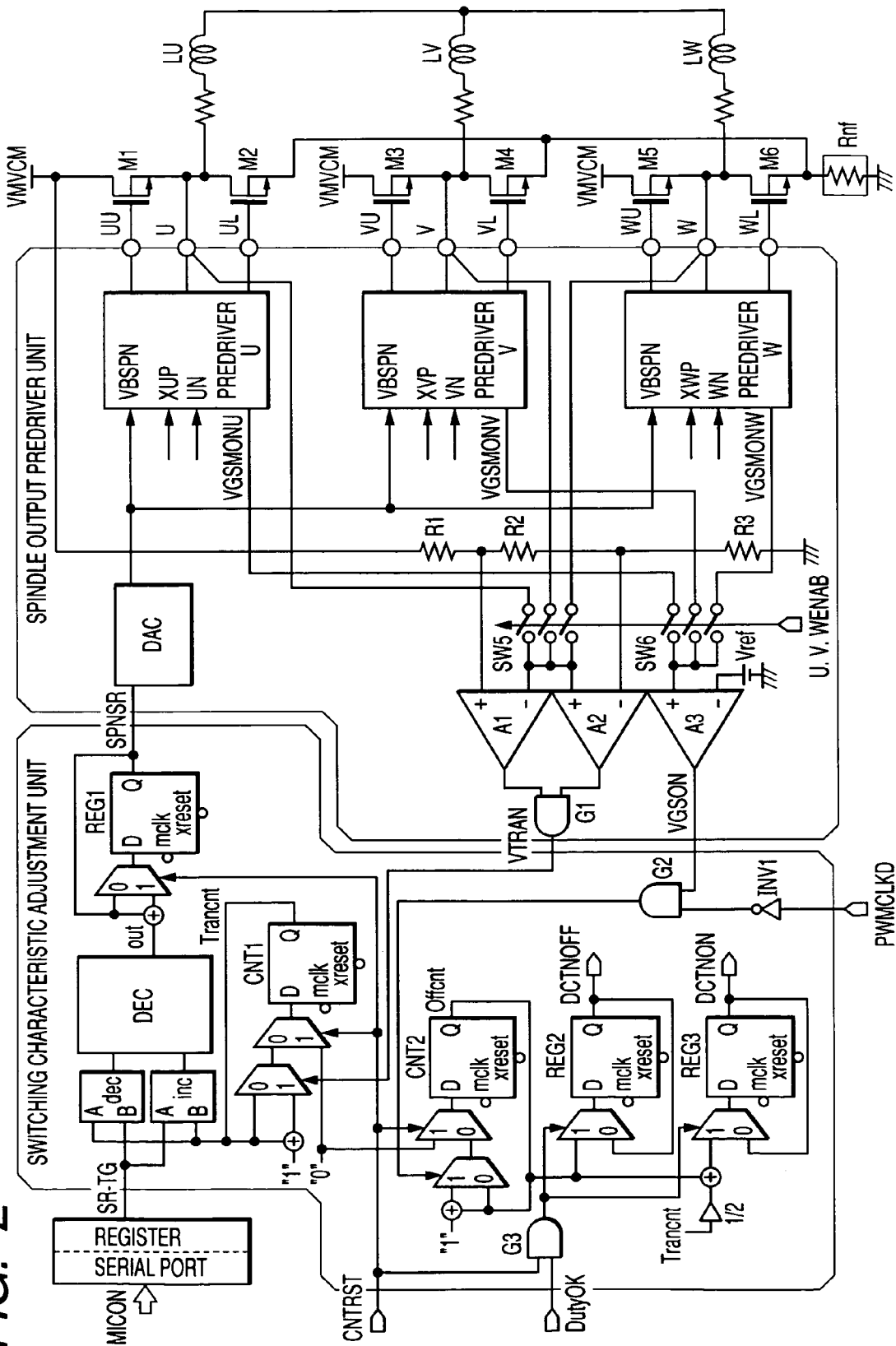
FIG. 2 is a block diagram depicting one embodiment illustrative of a spindle output predriver unit, an output stage, a motor and a switching characteristic adjustment unit of the motor drive device shown in FIG. 1.

A block diagram of one embodiment illustrative of the spindle output predriver unit, output stage and motor, and switching characteristic adjustment unit of the motor drive device shown in FIG. 1 is shown in FIG. 2. The three-phase motor coils LU, LV and LW are PWM-driven by the power MOSFETs M1 through M6 and spindle output predriver unit. The spindle output predriver unit is operated with, as inputs, the output control signals XUP, UN, XVP, VN, XWP and WN generated by the output control & PWM modulation unit. The predrivers for respective phases are operated with a current corresponding to an output voltage VBSPN of the digital-analog converter DAC, which changes in magnitude depending on the SPNSR signal generated at the switching characteristic adjustment unit, so that the switching times of the power MOSFET M1 to M6 are adjusted.

The predrivers for the respective phases respectively output signals VGSMONU, VGSMONV and VGSMONW proportional to gate-to-source voltages Vgs of the downside power MOSFETs M2, M4 and M6. A switch SW6 selects any of the signals VGSMONU, VGSMONV and VGSMONW on the basis of the signal of the phase at which the PWM operation is being performed based on each of the UENAB, VENAB and WENAB signals formed by the output control & PWM modulation unit. A comparator A3 compares the selected signal with a reference voltage Vref to thereby generate a signal VGSON having judged turning on/off of the corresponding power MOSFET, after which it is inputted to the switching characteristic adjustment unit.

The phase in which each of the spindle outputs U, V and W performs a PWM operation based on each of the UENAB, VENAB and WENAB formed by the output control & PWM modulation unit, is selected by a switch SW5. Comparators A1 and A2 compare the selected phase with signals obtained by dividing a source or power supply voltage VMVCM by resistors R1 through R3 and inputs its output to a gate circuit G1 from which a signal VTRAN brought to a high level only during a period in which each spindle output is being transitioned, is generated and inputted to the switching characteristic adjustment unit.

The switching characteristic adjustment unit generates a dead time for avoiding simultaneous turning on of the upside and downside power MOSFETs M1 and M2, M3 and M4 and M5 and M6 and generates such an input signal SPNSR for the digital-analog converter DAC that the switching time is brought to the optimum. The switching characteristic adjustment unit performs resetting of counters CNT1 and CNT2 and updating of registers REG1 through REG3 in accordance with a signal CNTRST brought to a high level by one clock for each PWM cycle.

When the VTRAN signal is high in level, i.e., only during the period in which each spindle output is being transitioned, the counter CNT1 performs counting and generates the sum Trancnt of switching times of the spindle outputs that appear twice within a PWM interval. A decoder DEC compares the Trancnt signal and the switching time target value SR-TG set by the micon. When SR-TG>Trancnt, −1 is added to the immediately preceding signal retained in the register REG1. When SR-TG=Trancnt, "0" is added to the signal SPNSR, and when SR-TG<Trancnt, "+1" is added to the signal SPNSR, so that the signal SPNSR is updated. Thus, the switching time is set to the optimum. That is, noise produced due to the transition of an output voltage between the power supply and GND at high speed is reduced and a switching loss produced due to excessive slowness of each switching time is reduced.

The VSGON signal formed by the switching characteristic adjustment unit and the PWMCLKD signal generated at the PWM signal generator are supplied to their corresponding gate circuit G2. Then the counter CNT2 measures a delay time Offcnt from the time when PWM is switched to off to the time when the gate-to-source voltage Vgs of each power MOSFET is actually reduced to the reference voltage Vref. When the Duty OK signal is high in level, a signal DCNTOFF retained in the register REG2 is updated based on the delay time Offcnt. A signal DCNTON held in the register REG3 is updated to a value obtained by subtracting only Transcnt/2 corresponding to one switching time from the Offcnt. Both signals DCNTON and DCNTOFF are inputted to the PWM signal generator, where the dead time for avoiding simultaneous on of PWM adapted to the on/off operation of the corresponding power MOSFET is set.

Figure 3:
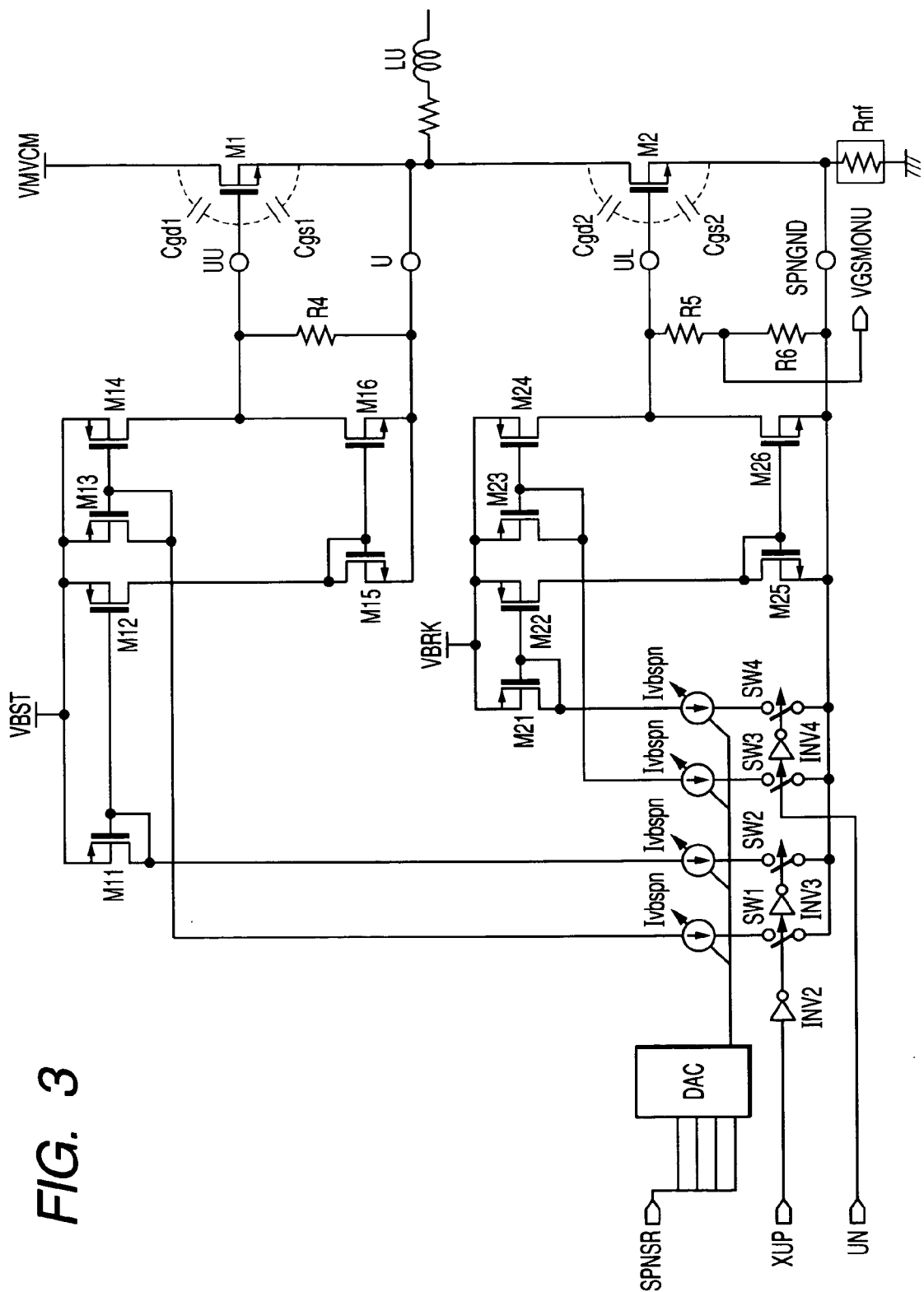
FIG. 3 is a circuit diagram showing one embodiment illustrative of the spindle output predriver unit and the output stage shown in FIG. 1.

A circuit diagram of one embodiment illustrative of the spindle output predriver unit and output stage of FIG. 1 is shown in FIG. 3. A circuit of a U phase of three phases comprising U, V and W is illustratively shown in the same drawing. The turning on/off of the upside and downside power MOSFETs M1 and M2 are controlled by the XUP and UN signals. When the XUP signal is low in level, the upside power MOSFET M1 is turned on. When the signal UN is high in level, the downside power MOSFET M2 is turned on. In order to avoid simultaneous turning on of the upside and downside power MOSFETs M1 and M2, the XUP and UN signals are respectively provided with delay times (dead times). When the UN signal is changed from the low to high levels, SW3 is turned on and SW4 is turned off so that MOSFETs M23 and M24 of a current mirror circuit are operated to charge gate capacitances Cgs2 and Cgd2 of the power MOSFET M2. When the gate-to-source voltage Vgs of the power MOSFET M2 is charged up to current that flows through the coil LU of the motor, the drive voltage U of the motor starts to change from the high level to the low level.

Figure 9:
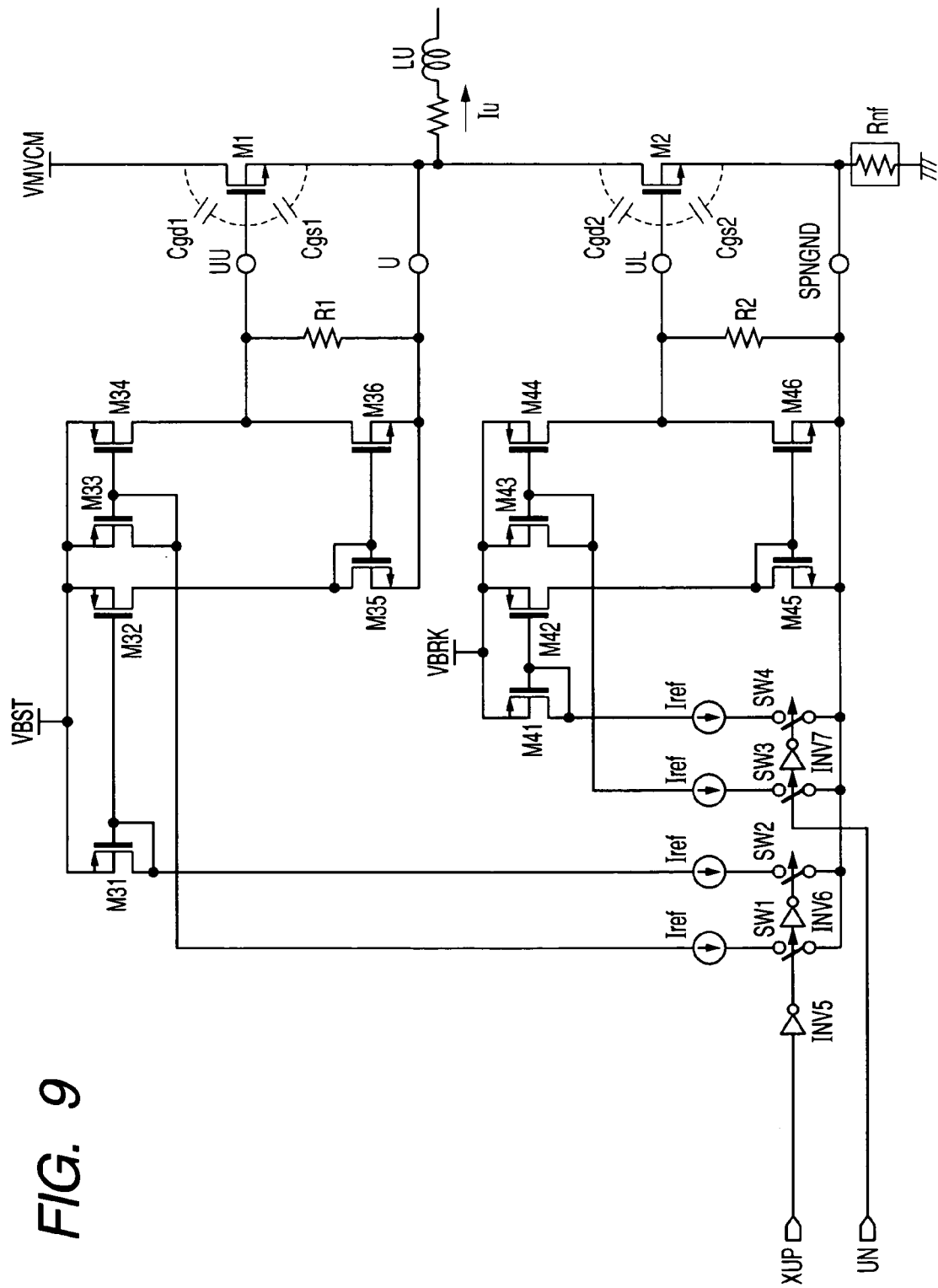
FIG. 9 is an output stage circuit diagram of a drive circuit of a spindle motor discussed prior to the present invention.

The difference from the spindle output stage shown in FIG. 9 resides in that the output stage is operated by the current corresponding to the digital-analog converter DAC operated based on the SPNSR signal obtained by the switching characteristic adjustment unit, and a voltage VGS-MONU obtained by dividing the gate-to-source voltage of the power MOSFET M2 by resistors R5 and R6 is outputted. Assuming that a power supply voltage is VMVCM and a current mirror ratio is m, a switching time tsr is expressed in tsr=Cgd2×VMVCM/(m×I vbspn) from the above equation (1). Therefore, the signal SPNSR corresponding to the input signal of the digital-analog converter DAC is changed and the current value Ivbspn of a current source is changed so that the switching time tsr of the spindle can be changed (adjusted).

Figure 4:
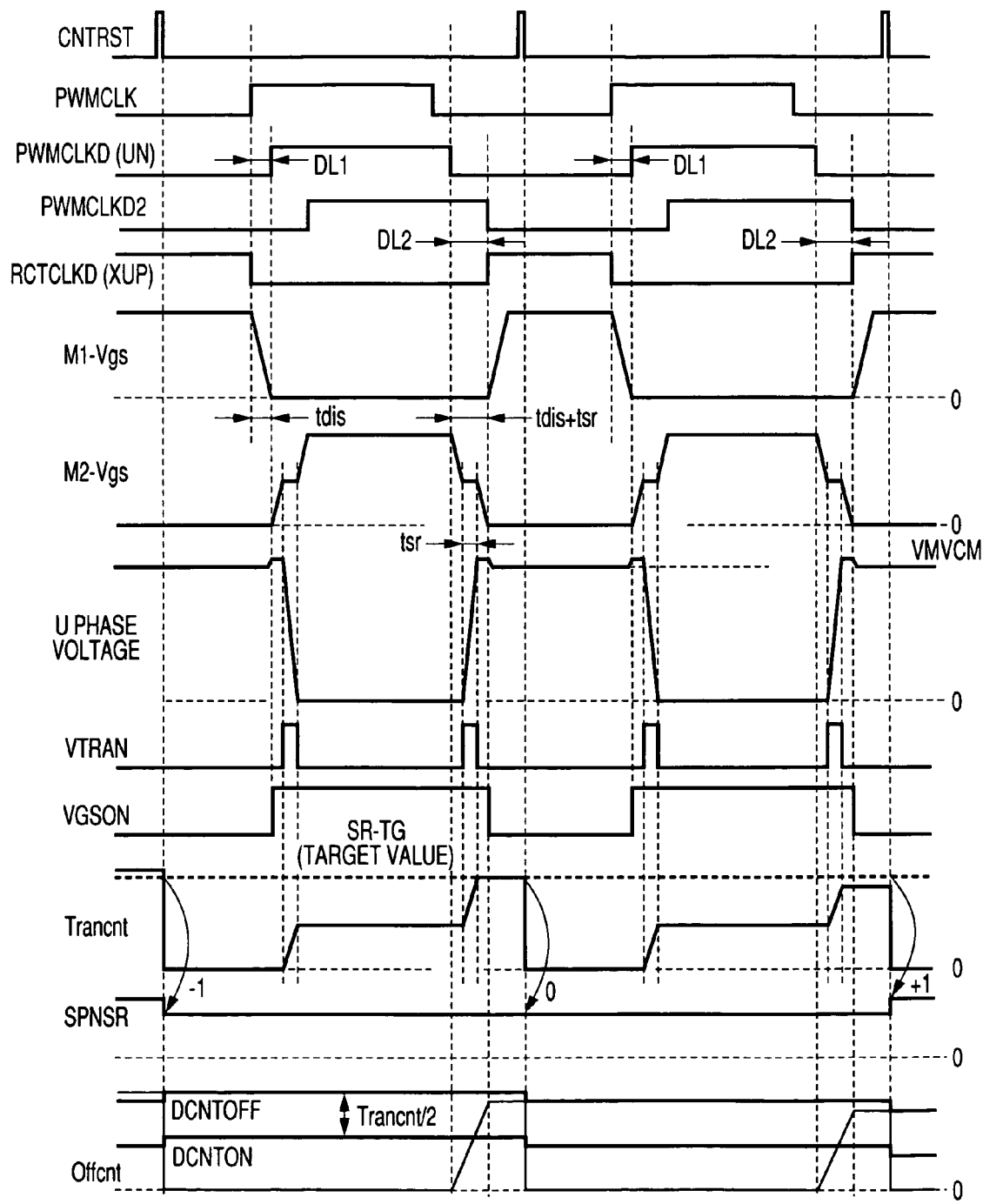
FIG. 4 is a waveform diagram illustrating one example of the operation of the motor drive device according to the present invention.

A waveform diagram of one example of the operation of the motor drive device according to the present invention is shown in FIG. 4. Resetting of the counters CNT1 and CNT2 that count Trancnt and Offcnt, and the updating of the signals SPNSR, DCNTOFF and DCNTON formed by the registers REG1 through REG3 are performed by the CNTRST signal brought to the high level by one clock for each PWM interval. The PWMCLKD (UN) signal is set to a signal delayed by a delay time DL1 corresponding to the DCNTON with respect to the PWM signal PWMCLK from the current controller.

The RCTCLKD (XUP) is set to a signal obtained by taking NOR of a signal PWMCLKD2 obtained by delaying the PWMCLKD signal by a delay time DL2 corresponding to the DCNTOFF and the PWMCLK, so that a regenerative signal provided with dead times corresponding to the DCNTON (DL1) on the on side of PWM and the DCNTOFF (DL2) on the off side thereof is obtained.

A description will be made of the operation of PWM at the time that the current is sinking, i.e., the downside power MOSFET M2 performs PWM. The gate-to-source voltage Vgs of the upside power MOSFET M1 is discharged on the falling edge of the regenerative signal RCTCLKD (XUP). Thus, since the power MOSFET M1 on the regeneration side is turned off, VMVCM+Vf is reached from the output voltage of U phase≈VMVCM. Incidentally, Vf corresponds to the forward voltage of a body diode of the MOSFET M1.

After the elapse of the delay time D1, the PWMCLKD (UN) rises so that the gate-to-source voltage Vgs of the downside power MOSFET M2 is charged. When the gate-to-source voltage Vgs of the downside power MOSFET M2 is charged by an amount equivalent to the current that flows through the motor, the output voltage (U-phase voltage) is transitioned from a high level to a low level. While the output voltage of the U phase is being transitioned, the VTRAN signal is brought to a high level. This time is counted by the counter CNT1 so that the Trancnt is counted up.

When the signal PWMCLKD (UP) falls, the gate-to-source voltage Vgs of the downside power MOSFET M2 is discharged. When the gate-to-source voltage Vgs of the downside power MOSFET M2 is discharged by an amount equivalent to the current that flows through the motor, the power MOSFET M2 loses its capability to cause the motor current to flow. Therefore, the output voltage (U-phase voltage) is transitioned from a low level to a high level. Even during this period, the VTRAN signal becomes high in level similarly. This time is counted by the counter CNT1 so that the Trancnt is counted up. Thus, the sum equivalent to two times, of the switching times associated with the spindle output voltage (U-phase voltage) is obtained as the Trancnt counted by the counter CNT1.

The signal RCTCLKD (XUP) rises after the elapse of the delay time DL2 and the upside power MOSFET is turned on again. Therefore, the output voltage (U-phase voltage) changes from VMVCM+Vf to the power supply voltage VMVCM. When the next signal CNTRST comes in, the updating of the SPNSR corresponding to the comparison between the count value Trancnt formed by the counter CNT1 and the target value SR-TG is carried out by the register REG1. Upon the following PWM operation, the spindle output stage is operated with the updated SPNSR (current Ivbspn) to set its switch time (tsr).

On the other hand, the VGSON signal is of a signal brought to a high level while the gate-to-source voltage Vgs of the power MOSFET M2 exists. The counter CNT2 counts a delay time at the time that the PWM signal is made off, in accordance with the signal and the PWMCLKD signal and forms Offcnt. This delay time corresponds to the sum of the time tdis required to discharge the power MOSFET and the switching time tsr. If the regeneration side is turned on after the elapse of this time, then the dead time can be minimized. Thus, the dead time on the off side is updated or renewed with this time as DCNTOFF and used to thereby form the regenerative signal RCTCLKD.

Since one obtained by subtracting the switching time tsr from the Offcnt measured by the counter CNT2 is of the optimum time as the dead time (DL1) on the on side, the time obtained by subtracting a value equivalent to half of the Trancnt equivalent to twice the switching time from the Offcnt is used as the DCNTON and updated by the register REG3. Repeating the above operations makes it possible to always obtain the optimum switching characteristics even if variations in the power MOSFETs M1 and M (M2 through M6), their temperature changes, their variations with time occur.

Figure 5:
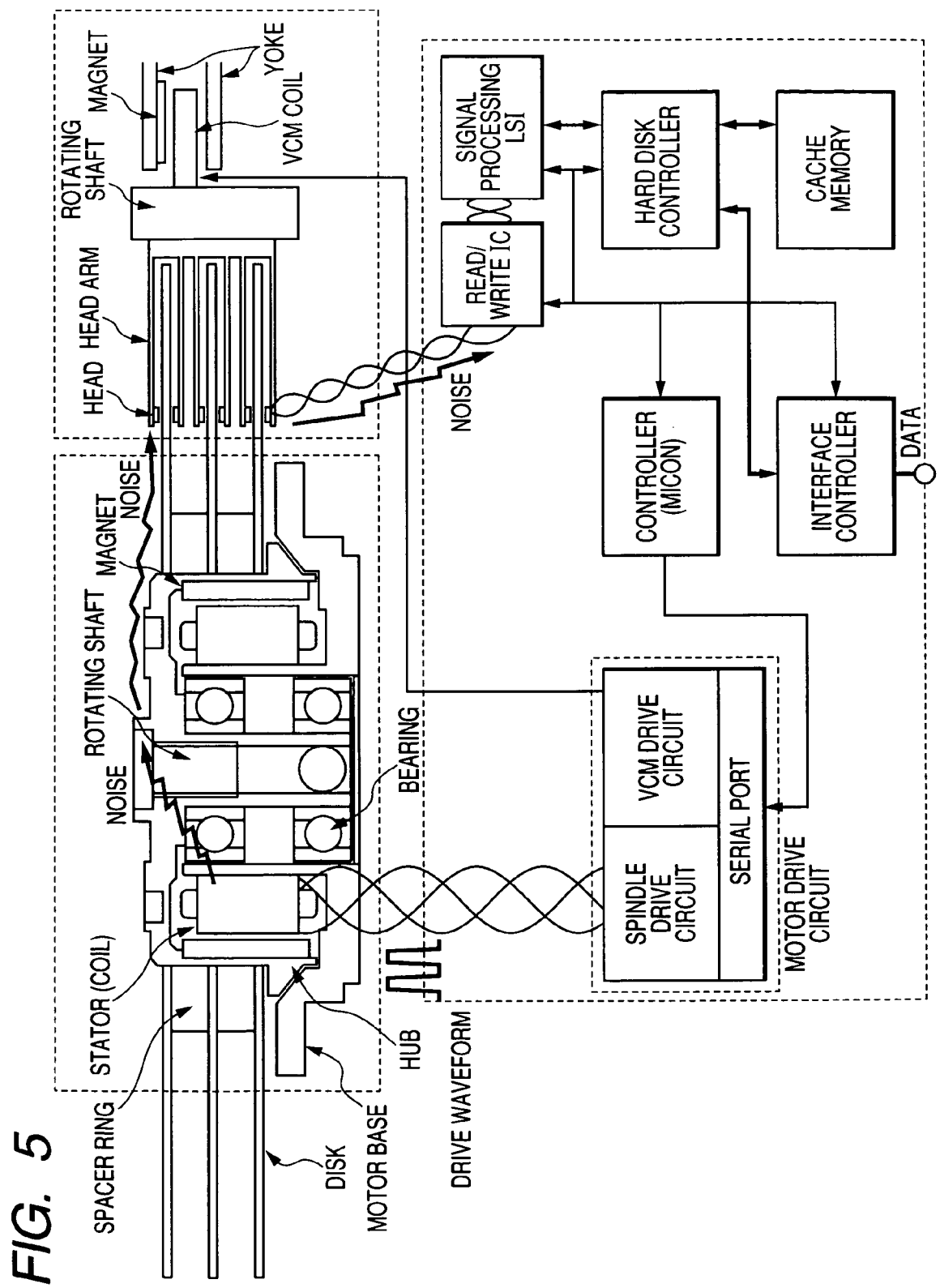
FIG. 5 is a mechanism diagram depicting one example of hard disk drive to which the motor drive device according to the present invention is applied.

A mechanism diagram of one embodiment of a hard disk drive (HDD) device to which the motor drive device according to the present invention is applied, is shown in FIG. 5. The present embodiment comprises a three-phase spindle motor control system, a voice coil motor control system and a magnetic head drive control system according to the present invention. In order to realize downsizing and high-density packaging of a mechanism section, a three-phase spindle motor has a coil corresponding to a stator and a magnet used as a rotor both placed inside a part called hub for holding a disk and rotates the disk about a rotating shaft.

A VCM obtains rotational thrust by causing current to flow through a VCM coil to thereby move a head. A motor drive control circuit comprises a semiconductor integrated circuit device in which a spindle motor drive control circuit having such a function as described in the above embodiment and a voice coil motor drive control circuit for moving a magnetic head in the radial direction of the disk are integrally formed. The motor drive control circuit is inputted with a control signal supplied from a micon through a serial port and operated in accordance with the control signal to control a voice coil motor and a spindle motor.

A read/write IC amplifies a current corresponding to a change in magnetism detected by the magnetic head (including MR head or the like) and transmits a read signal to a signal processing LSI (data channel processor). Further, the read/write IC amplifies a write pulse signal sent from the signal processing LSI and outputs a drive current of the corresponding magnetic head. The signal processing LSI performs signal processing such as a modulation/demodulation process suitable for digital magnetic recording and waveform shaping having taken into consideration magnetic recording characteristics and reads positional information from the read signal of the magnetic head. A hard disk controller takes or fetches in read data transmitted from the signal processing LSI and effects an error correcting process on it, and performs an error correction encoding process on write data sent from a host and outputs it to the signal processing LSI. An interface controller performs the transfer of data between the present system and an external device and its control, etc. The hard disk controller is connected to a host computer such as a microcomputer of a personal computer body via the interface controller.

A cache memory is used as for a buffer which temporarily stores read data read from a magnetic disk at high speed. A controller comprising the micon (microcomputer) determines which operation mode corresponds, on the basis of a signal sent from the hard disk controller, and controls each part of the system in association with the operation mode. Further, the controller calculates a sector position or the like, based on address information supplied from the hard disk controller.

In the hard disk drive (HDD) device constructed as described above, there may be cases where when a steep voltage change occurs in the drive voltage of the spindle drive circuit, EMI, i.e., noise occurs, which in turn is transferred from the coil to the rotating shaft and superimposed on the read signal detected by the corresponding magnetic head through a disk surface, thus causing degradation in error rate of the read signal of the signal processing LSI. Therefore, there is a need to suppress a steep change to such an extent that the error rate is not degraded with respect to the drive voltage of the spindle drive circuit. It is also necessary to reduce a switching loss as small as practicable from the viewpoint of a power loss. It is thus desired that the switching time tsr of the drive voltage of the spindle drive circuit be controlled accurately. In the embodiment referred to above, the addition of the above switching characteristic adjustment unit and the use of the variable current capable of setting the switching time tsr in the predriver unit on the basis of the signal SPNSR formed by the switching characteristic adjustment unit makes it possible to reduce even the power loss while ensuring a reduction in noise.

As a method of detecting the switching time tsr, the gate-to-source voltage Vgs of each power MOSFET is monitored without using a method for monitoring a spindle output voltage. In this case, the time at which the gate-to-source voltage Vgs falls within a specific range (including a level at which Vgs becomes constant), is measured. This can also be used for control of the switching time. The spindle output voltage may be monitored as in the above embodiment in that this method needs to consider the influence of a variation in threshold voltage Vth of each power MOSFET.

Figure 6:
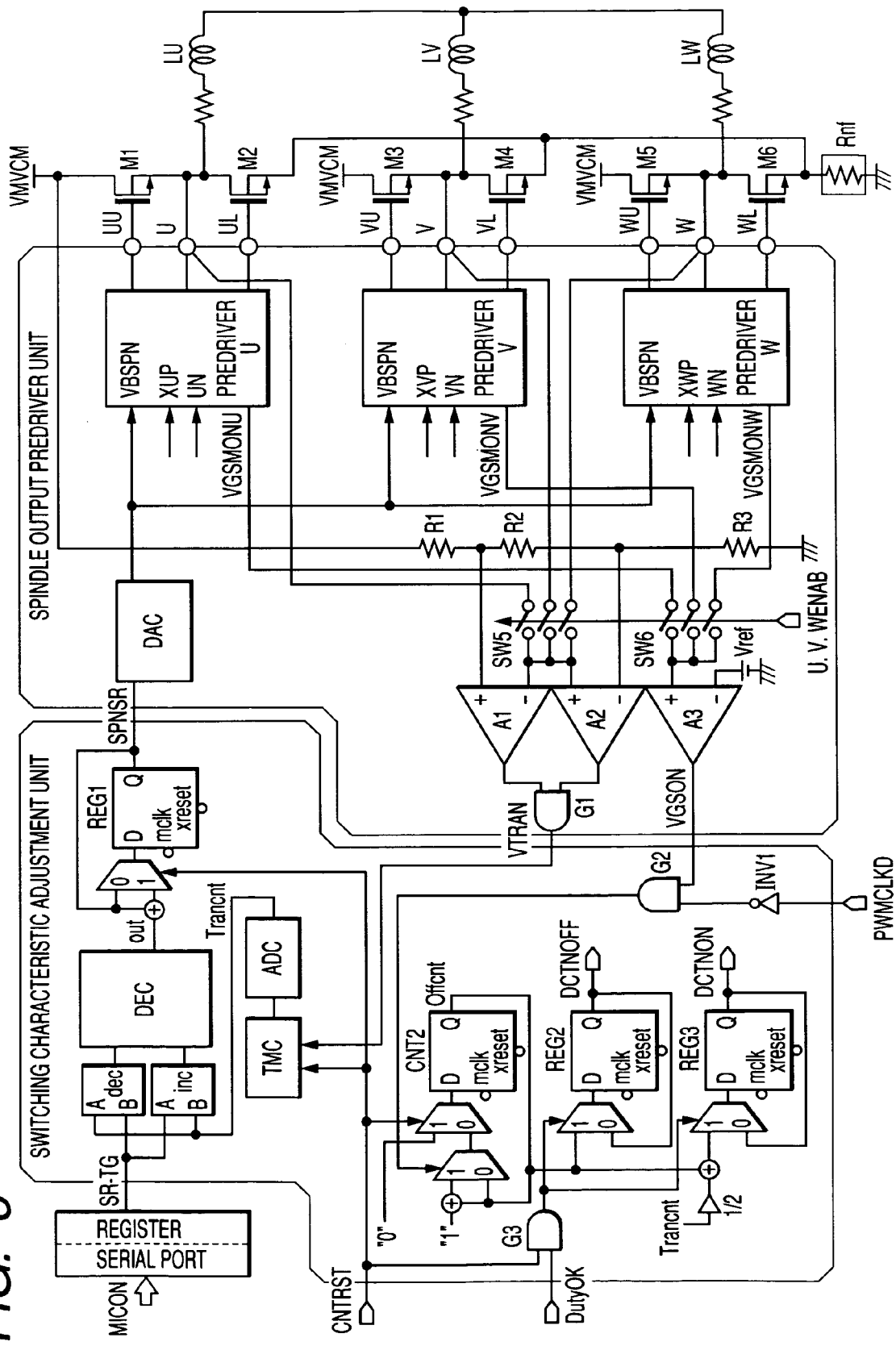
FIG. 6 is a block diagram showing another embodiment illustrative of the spindle output predriver unit, output stage, motor and switching characteristic adjustment unit of the motor drive device shown in FIG. 1.

A block diagram of another embodiment illustrative of the spindle output predriver unit, output stage, motor and switching characteristic adjustment unit of the motor drive device shown in FIG. 1 is shown in FIG. 6. In the present embodiment, as a method for measuring each switching time, a capacitor is charged up with a constant current during a switching time by means of a timer circuit TMC using an integrator without using the counter CN1, and thereby a voltage signal corresponding to the switching time is formed. An analog-digital converter ADC converts this voltage to a digital signal to form a measured value Trancnt of the switching time. The following is similar to the embodiment shown in FIG. 2. This method is effective for a case in which a logic circuit operated with a high speed clock is not provided.

As a method for generating dead times (DL1 and DL2), the dead times are generated with the switching time tsr of the spindle output as the base as an alternative to the method for monitoring the gate-to-source voltage Vgs of the power MOSFET. This makes use of the fact that since the switching time and the delay time are both determined based on the parasitic capacitances of each power MOSFET, the power supply voltage and the reference current of each predriver, the delay time can be expressed as being equal to k×switching time, i.e., delay time=k×switching time. Although a circuit scale can be reduced in that the comparators and counters can be reduced in number if such a method is used, there is a need to provide a margin for each dead time to some extent in that it is not the delay time itself. Although one control value SPNSR is used with respect to the switching characteristics of the three phases in the present embodiment, such a configuration that the DACs corresponding to the three phases are prepared so that the three phases are independently controlled, may be adopted. In this case, such a configuration is capable of adapting even to variations between the phases.

In the above embodiment, the transition time for the output voltage at which the PWM operation is being performed, is measured by the counter, and the reference current of the spindle predriver is changed such that it coincides with the target value. Consequently, the intended switching time can always be obtained without being affected by variations in the manufacture of each power MOS, variations in reference current and current mirror, temperature characteristics and dependence on the power supply voltage. Therefore, the intended switching time can be obtained similarly even if a change in power MOSFET occurs. Even in an inexpensive CMOS process (reference material: Hisayoshi Yani and Jou Nagata, "Revised Integrated Circuit Engineering (2)", Corona Publishing Co., Ltd., p. 230 and 231) large in variation with time of a device due to hot carriers or the like, a motor drive circuit capable of obtaining the targeted switching time can be realized.

Since the target value can be set from the micon, the switching time adapted to the result of observation of noise or the like in a state in which the device is mounted to an actual system, can be changed. The dead times for avoiding simultaneous turning on of the power MOSFETs are generated from the signal for determining on/off of each power MOSFET from the gate-to-source voltage Vgs of the power MOSFET and the signal for controlling on/off of each power MOSFET therefrom. Thus, the optimum dead time can be obtained without being affected by variations in the manufacture of each power MOSFET, variations in reference current and current mirror, temperature characteristics, dependence on the power supply voltage and variations with time. Even if a change in power MOSFET occurs, the optimum dead time can be obtained similarly. That is, the power MOSFETs are suitable for use in a semiconductor integrated circuit device different from the predriver unit or a single power MOSFET.

Since the constant switching time tsr is obtained under the feedback control of the above embodiment, the minimization of the switching time free of degradation in the error rate of HDD and the switching loss can be realized and hence the power loss can be minimized. Since the optimum dead time can be obtained by measuring the delay time of each power MOSFET, it is possible to avoid simultaneous turning on of the power MOSFETs and minimize a power loss. Characteristic variations such as torque ripples can be reduced upon sine wave current drive susceptible to distortion in PWM modulation in that the switching characteristics can be kept constant.

Figure 7:
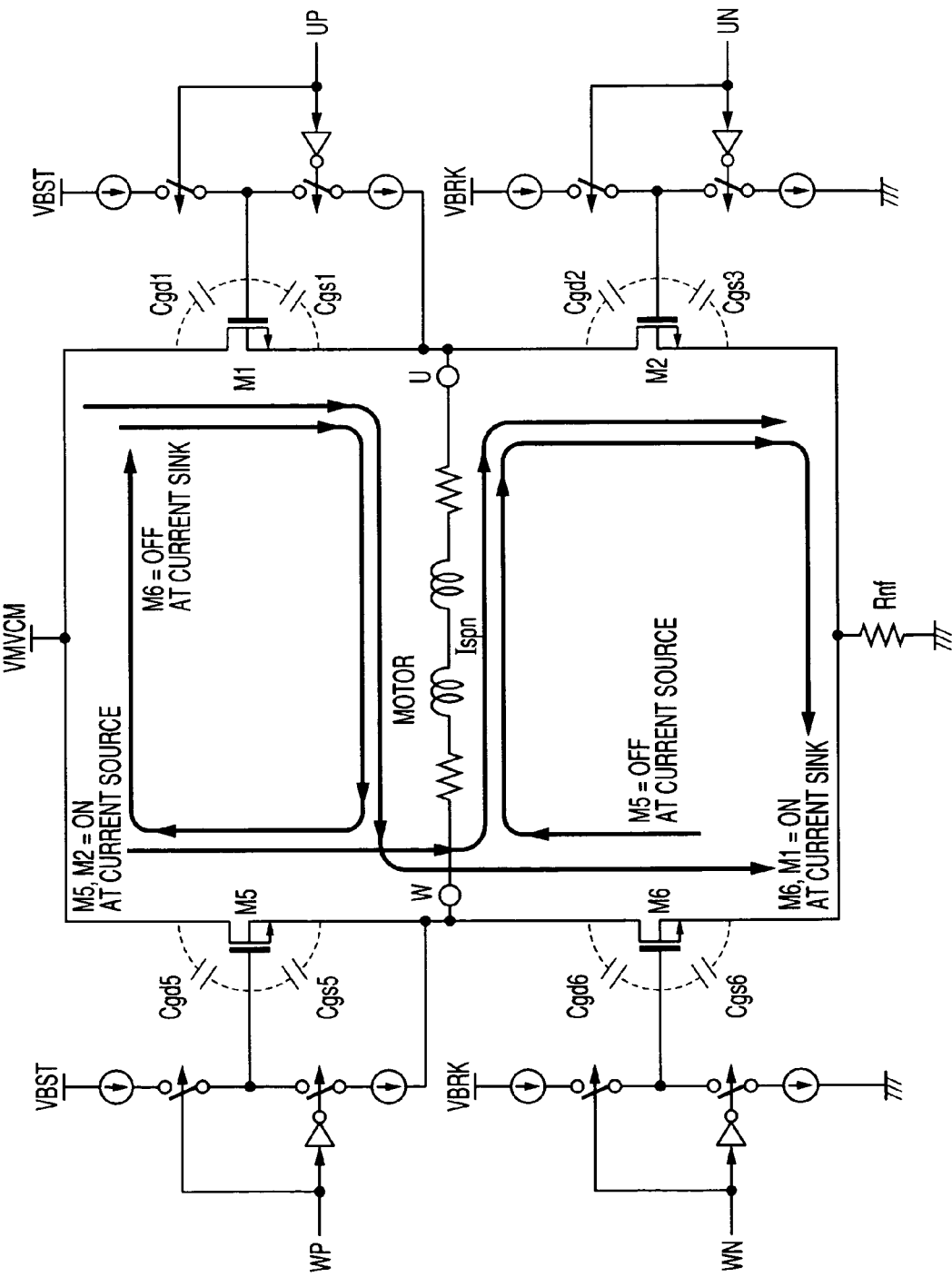
FIG. 7 is a circuit diagram depicting one operation example of the output stage of the motor drive device according to the present invention.
Figure 8:
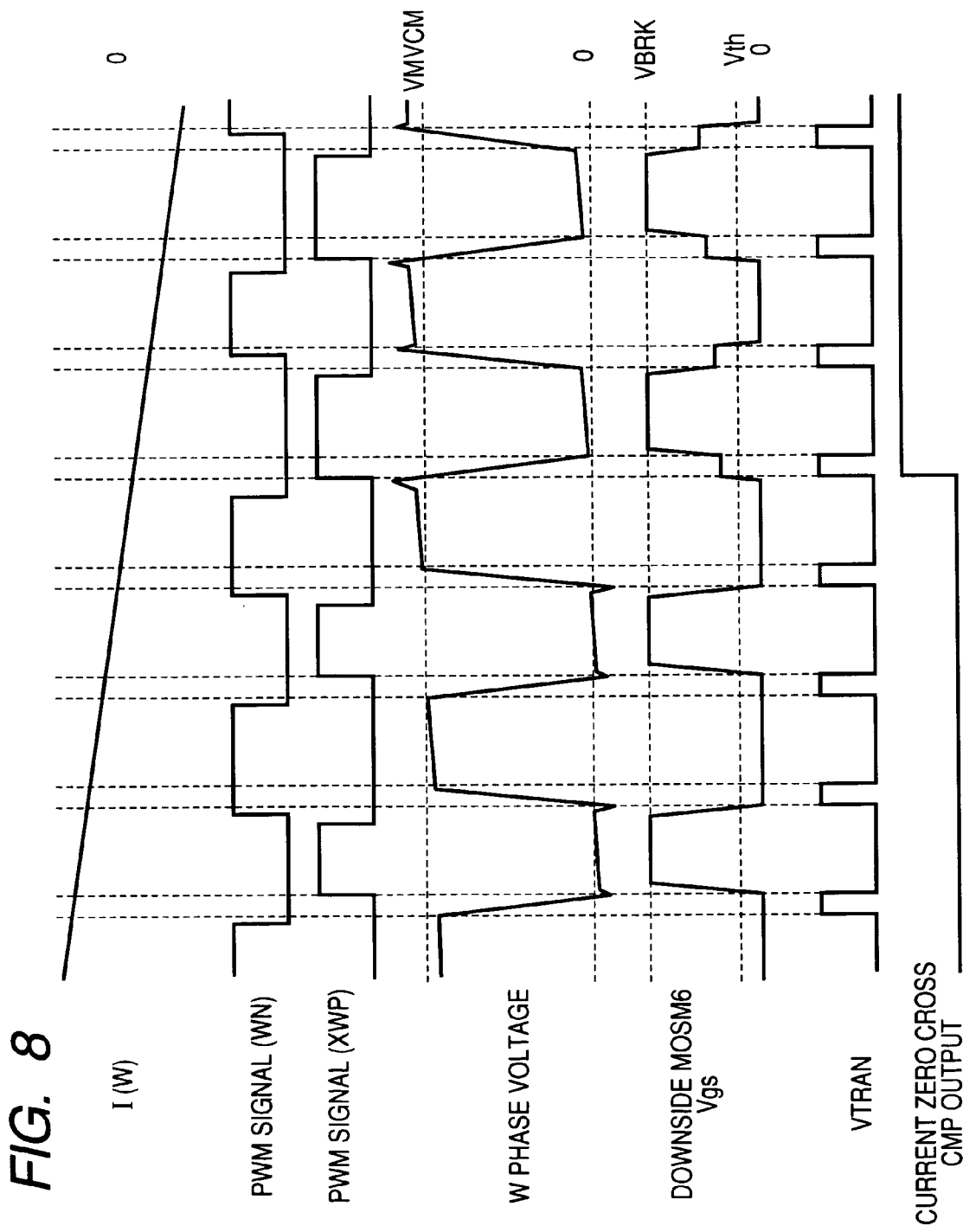
FIG. 8 is an operation waveform diagram for describing the operation of the motor drive device shown in FIG. 7.

A basic circuit diagram of one embodiment of the output stage of the motor drive device according to the present invention is shown in FIG. 7. Drive current paths in operating states of half bridge circuits and power MOSFETs corresponding to two phases are also typically illustrated together by arrows. When the configuration of the output stage is considered as two phases of U and W, such a half bridge (H bridge) type circuit configuration as shown in the same figure is formed. The power MOSFETs M1, M2, M5 and M6 are on/off-controlled depending on whether gate capacitances Cgd and Cgs are charged or discharged according to their control signals UP, UN, WP and WN. Since the power MOSFETs are all N channel MOSFETs, they are turned on when their gate-to-source voltages are greater than or equal to their threshold voltages and turned off when less than or equal to the threshold voltages, respectively. Thus, there is a need to operate a control circuit for the upside power MOSFETs M1 and M5 at a power supply VBST obtained by stepping up or boosting a power supply VMVCM.

Now consider a state in which, for example, the current for driving a motor flows from the power supply VMVCM to the power MOSFET M2 through the power MOSFET M5 and motor, i.e., a state in which a W phase is a current source and a U phase is a current sink. When the power MOSFETs M5 and M2 are tuned on by a PWM operation, the drive current flows through the power supply-M5-motor-M2-Rnf in that order. At this time, the output voltage of the W phase results in VMVCM−Ron×Ispn. Here, Ron indicates an on resistance of each of the MOSFETs M1, M2, M5 and M6.

On the other hand, when the power MOSFET M5 is turned off by the PWM operation, the current that flows through the motor is maintained by the time constant of a coil. Therefore, such a regenerative current that the drive current is regeneratively supplied like M6-motor-M2-M6 flows. At this time, the output voltage of the W phase results in −Ron×Ispn. Let's now consider a state in which the output voltage is transitioned. Since the power MOSFET M5 is operated in a saturated state where the drive current is of source, the output voltage is transitioned. Thus, the gate-to-source voltage Vgs of each power MOSFET during the transition of the output results in Vgs>Vth on its upper side and results in Vgs=0V on its lower side in the case of the current source.

Next consider a state in which the current for driving the motor flows from the power supply Vps to the power MOSFET M6 through the power MOSFET M1 and motor, i.e., a state in which the W phase is a current sink and the U phase is a current source. When the power MOSFETs M1 and M6 are tuned on by a PWM operation, the drive current flows through the power supply-M1-motor-M6-Rnf in that order. At this time, the output voltage of the W phase results in Ron×Ispn.

On the other hand, when the power MOSFET M6 is turned off by the PWM operation, the current that flows through the motor is maintained by the time constant of the coil. Therefore, the drive current regeneratively flows like M1-motor-M5-M1. At this time, the output voltage of the W phase results in VMVCM+Ron×Ispn. Let's now consider a state in which the output voltage is transitioned. Since the power MOSFET M6 is operated in a saturated state where the drive current is of a sink, the output voltage is transitioned. Thus, the gate-to-source voltage Vgs of each power MOSFET during the transition of the output results in Vgs=0V on its upper side and results in Vgs>Vth on its lower side in the case of the current sink. Since Vsg placed during the output transition differ depending on whether the current is of the source or sink with respect to one phase, current zero cross detection is enabled from the above operations.

An operation waveform diagram for describing current zero cross detection based on 180-deg energization, according to the present invention is shown in FIG. 4. A state in which a drive current I(W) of a W phase is changed from a source to a sink, is illustratively shown as typical in the same figure. In PWM signals WP and WN, the duty in which the upside power MOSFET (M5) is on, is gradually reduced. Thus, the drive current is changed from the source to the sink. When the upside power MOSFET (M5) is turned off where the drive current I(W) is of the source, the output voltage is brought to a negative potential and thereby regenerated through the lower side (M6). When the downside power MOSFET (M6) is turned off where the drive current I(W) is sinking, the output voltage becomes higher than the power supply and thereby regenerated through the upper side. Paying attention to a transition period of the output voltage, the gate-to-source voltage Vgs of the downside power MOSFET (M6) in the case of the current source is 0V, whereas the gate-to-source voltage Vgs of the downside power MOSFET (M6) in the case of the current sink becomes higher than the threshold voltage Vth. In the spindle unit system of the present embodiment, the detection of a current zero cross can be performed using Vgs of the downside MOSFET, sampled by the signal VTRAN. A phase detection unit for detecting each rotational phase of the motor based on the result of detection of the current zero cross can be configured.

Figure 10:
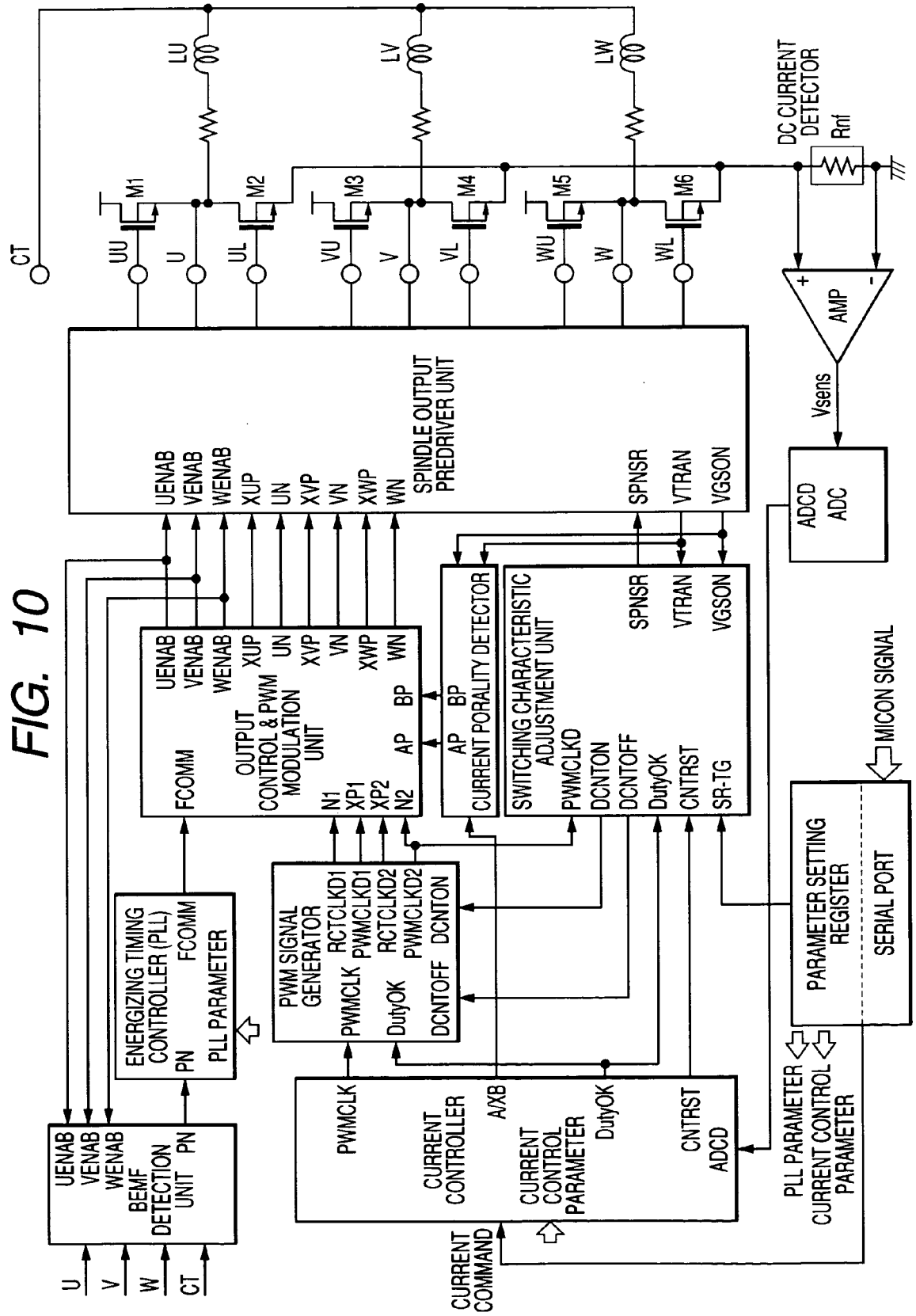
FIG. 10 is a block diagram showing another embodiment of a motor drive device according to the present invention.

A block diagram of another embodiment of a motor drive device according to the present invention is shown in FIG. 10. The present embodiment is of a modification of the embodiment shown in FIG. 1 and is added with a current polarity detector. In association with the current polarity detector, two sets of signals like signals PWMCLKD1 and 2 and RCTCLKD1 and 2 are formed even at the PWM signal generator. Even at the output control & PWM modulation unit that accept the signals, the signal input terminals are changed like N1 and N2, and XP1 and XP2. It has been revealed by a further study of the inventors of the present application that in the motor drive device, distortion occurs in a PWM drive waveform so long as a selection as to to which drive signal of upside and downside output MOSFETs a dead time should be given, is not suitably made according to current polarity indicative of whether an output current is sinking or source. The invention of the present application discloses a configuration and means for resolving a new problem that when the direction in which the dead time is given becomes improper in the vicinity of switching of the current polarity in the case of a multimotor like a three-phase motor, zero cross distortion occurs and hence a torque ripple increases.

The current polarity detector selectively detects gate-to-source voltages Vgs of downside MOSFETs M2, M4 and M6 of respective output phases during periods VTRAN in which respective output voltages of U, V and W are respectively transitioned, and determines current polarity according to the detected value. A polarity select signal A/XB for distinguishing between the detection of a high level edge of PWM and the detection of a low level edge thereof is also inputted to the current polarity detector. The same signal A/XB is generated by a current controller and produced together with a PWM signal PWMCLK.

In FIG. 9, the turning on/off of the upside and downside MOSFETs M1 and M2 are controlled by their corresponding drive signals XUP and UN. When the drive signals XUP and UN are low in level, the upside power MOSFET M1 is turned on, and when the drive signal UN is high in level, the downside power MOSFET M2 is turned on. In order to avoid simultaneous turning on of the upside and downside power MOSFETs M1 and M2, the drive signals XUP and UN are provided with dead times respectively. When a coil current Iu is in a source state (flows in the direction indicated by arrow in the same figure), the upside drive signal XUP is brought to a control signal to determine PWM duty. The downside drive signal UN is brought to a regenerative signal for suppressing a loss produced due to a regenerative current at the turning off of the upside power MOSFET M1. When the coil current Iu is in a sink state (flows in the direction opposite to the direction indicated by arrow in the same figure), the downside drive signal UN is brought to a control signal to determine PWM duty. The upside drive signal XUP becomes a regenerative signal for suppressing a loss produced due to a regenerative current at the turning off of the downside power MOSFET M2.

Figure 11:
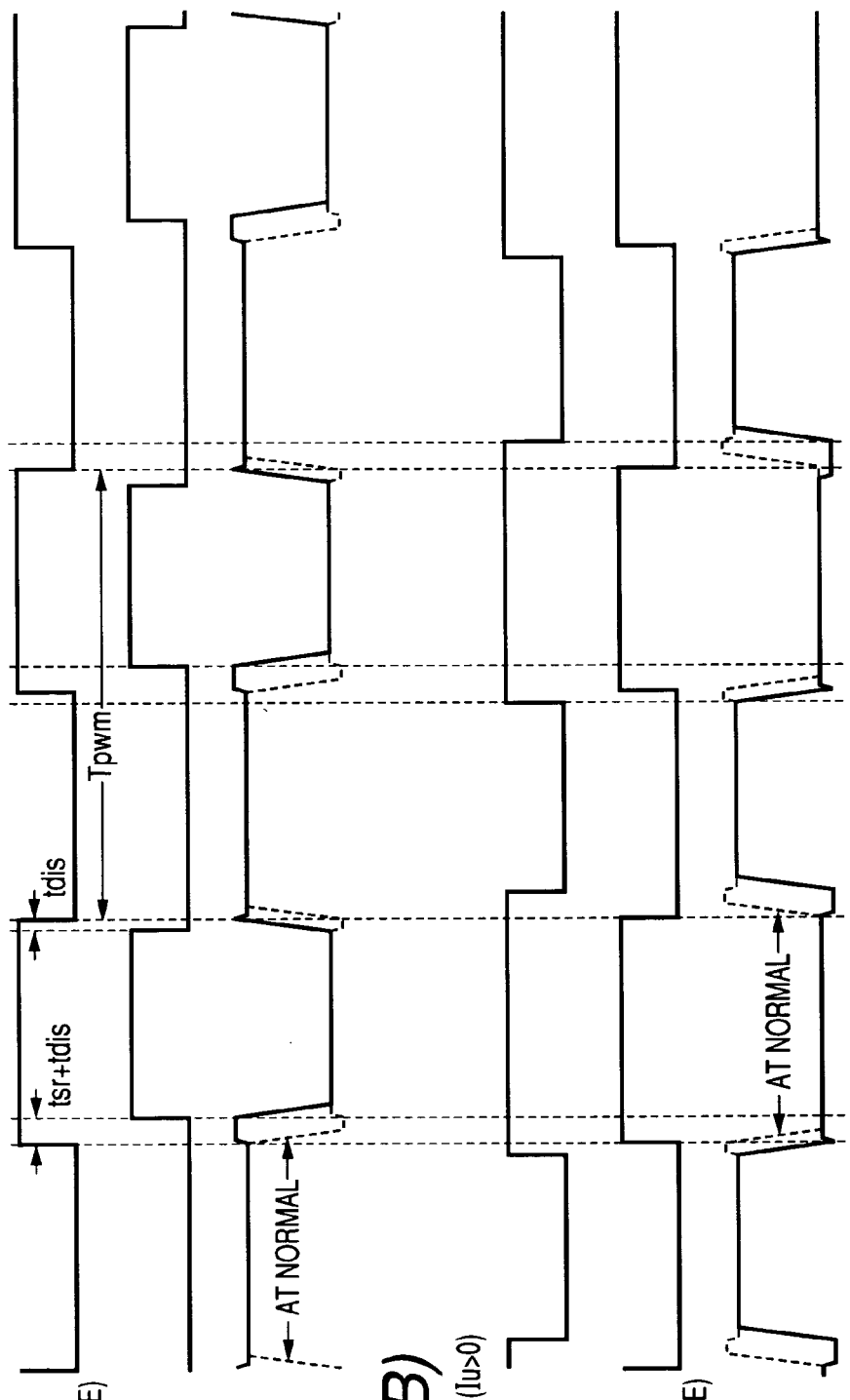
FIG. 11 is a waveform diagram for describing a case in which the relationship between coil current polarity and control/regeneration sides is improper in the circuit shown in FIG. 9.

A waveform diagram for describing a case in which a relationship among the polarity of the coil current Iu in each of the source and sink states, the control side and the regeneration side is placed in an inverted state in the circuit shown in FIG. 9, is illustrated in FIG. 11. The same figure (A) shows a waveform diagram at the time that the current is sinking (Iu<0) in a state in which a drive signal is inputted with the upper side as the control side. Since the lower side and the upper side are respectively operated as the control side and the regeneration side in this condition as shown inside the parentheses of the same figure, pulse duty is increased by tsr+2×tdis equivalent to the sum of dead time intervals. Therefore, the current is increased by an amount equivalent to the sum of the dead time intervals when a drive current is taken into consideration. Here, the time tsr corresponds to the switching time.

The same figure (B) shows a waveform diagram at the time that the current is source (Iu>0) in a state in which a drive signal is inputted with the lower side as the control side. Since the upper side and the lower side are respectively operated as the control side and the regeneration side in this condition contrary to above as shown inside the parentheses of the same figure, pulse duty is decreased by tsr+2×tdis equivalent to the sum of dead time intervals. Therefore, the current is decreased by an amount equivalent to the sum of the dead time intervals when a drive current is taken into consideration.

Thus, as long as a selection as to to which output MOSFET of the upside and downside MOSFETs the drive signal or regenerative signal should be given, is not suitably made according to whether the current is sinking or source, an error occurs in a PWM drive waveform by a dead time, so that desired PWM duty cannot be obtained. This results in zero cross distortion of the drive current, thus causing an increase in torque ripple. In order to solve such a problem, there is a need to provide such a current polarity detector as shown in the embodiment shown in FIG. 10.

In FIG. 10, two sets of timing signals PWMCLKD1 and 2 and RCTCLKD1 and 2 (XP1, 2, N1 and N2) are prepared for the PWM signal generator and output control & PWM modulation unit. That is, the timing signals RCTCLKD1, PWMCLKD1, RCTCLKD2 and PWMCLKD2 formed by the PWM signal generator are transferred as the signals N1, XP1, XP2 and N2 of the output control & PWM modulation unit.

Figure 12:
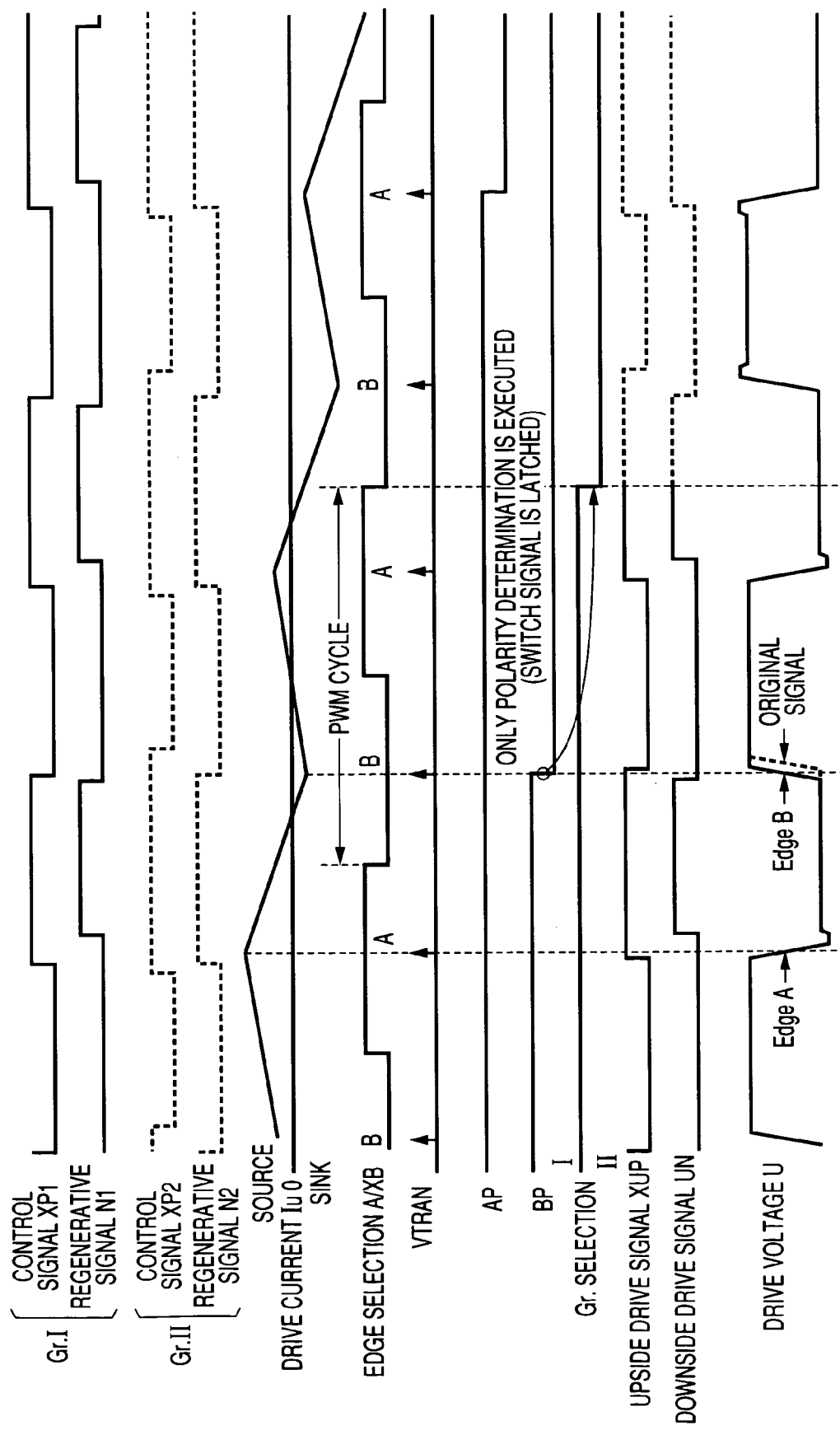
FIG. 12 is a timing diagram for describing one example of the operation of the motor drive device shown in FIG. 10.

A timing diagram for describing one example of the operation of the motor drive device shown in FIG. 10 is shown in FIG. 12. In the same figure, a source (Gr.I) timing signal indicated by solid lines comprises XP1 defined as a control signal and a timing signal N1 defined as a regenerative signal. That is, the upside output MOSFET M1 is on/off-controlled corresponding to PWM duty and the timing signal is generated so as to be assigned dead times on the timing signal N1 side. The turning on/off of the downside output MOSFET M2 is controlled in association with it. A sink (Gr.II) timing signal indicated by dotted lines comprises a regenerative signal defined as XP2, and a timing signal N2 defined as a control signal. That is, the downside output MOSFET M2 is on/off-controlled corresponding to PWM duty and the timing signal is generated so as to be assigned dead times on the timing signal N2 side. The turning on/off of the upside output MOSFET M1 is controlled in association with it.

The PWM signal generator generates a Gr.I pair (XP1 and N1) comprising the drive signal pair PWMCLKD1 and RCSCLDK1 at the current source, provided with suitable dead times (DCNTON and DCNTOFF) obtained by a switching characteristic adjustment logic from the PWM signal PWMCLK obtained by the current controller, and a Gr.II pair (XP2 and N2) comprising the signals PWMCLKD2 and RCSCLKD2 at the current sink. The output control & PWM modulation unit is inputted with the drive signal pair Gr.I (XP1 and N1) and the drive signal pair Gr.II (XP2 and N2). Of the same pair signals, such a pair that a duty error in PWM driving is not produced, is selected on the basis of the result of AP and the result of BP by the current polarity detector.

Now, a decision as to the polarity of current is performed during a transition period VTRAN of a drive voltage in the current polarity detector. Thus, the current polarity changes and an error occurs in the original duty (Duty) signal indicated by a dotted line in the same figure. Thereafter, the signal is switched from (Gr.) for the source to (Gr.II) for the sink in accordance with a change of the signal BP to a low level. Even in the next PWM cycle, the pair (Gr.II) of both suitable PWM control signal and regenerative signal free of an error, corresponding to a sink operation is selected as indicated by a dotted line. Thus, the number of times that an error at the time of current polarity switching occurs, can be reduced to the minimum.

Since the drive current at the PWM driving increases and decreases in conjunction with the PWM drive signal, the drive current repeats the sink and source in the PWM cycle in the neighborhood of current zero cross (switching point). That is, there is a possibility that when the increase and decrease in drive current is extremely slow, the pair of drive signals is switched and corrected after the error has occurred once as described above, so that the pair of drive signals that always causes an error in the vicinity of the zero cross in the worst case, will continue to be selected. Thus, the sine wave driving of the three-phase motor makes use of the fact that the drive current monotonously decreases and increases in the vicinity of the zero cross of the drive current. After determination as to the polarity of the drive current is switched and the pair of drive signals is switched to a suitable pair free of the occurrence of an error, the pair of drive signals is maintained during PWM cycles corresponding to a predetermined of number of times, which are held in a latch and defined in advance, whereby the above problem can be solved.

As a method for switching between the pairs (Gr.I) and (Gr.II) of the drive signals, may be mentioned, a single edge determination type for performing switching of the pair of drive signals, based on current polarity determination at an edge at which the switching of a drive current is reached ahead, at or under current polarity determination at an edge at which a drive voltage changes from a high level to a low level in the operation waveform diagram of FIG. 12 and current polarity determination at an edge at which the drive voltage changes from a low level to a high level in the operation waveform diagram of FIG. 12. The single edge determination type is advantageous because an edge in which an error occurs, may be once in the case of relatively steep switching of current polarity.

Figure 13:
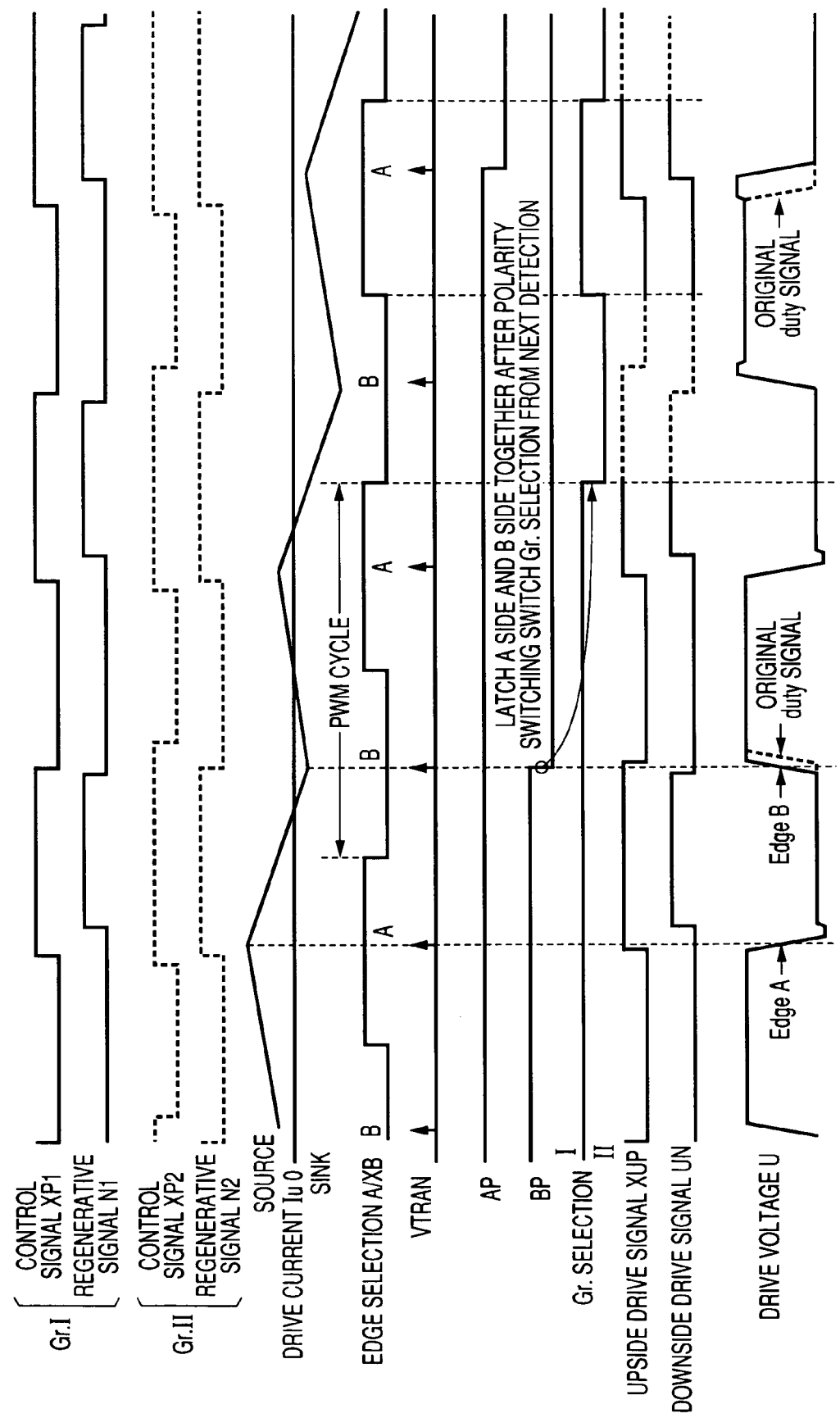
FIG. 13 is a timing diagram for describing another example of the operation of the motor drive device shown in FIG. 10.

A timing diagram for describing another example of the operation of the motor drive device shown in FIG. 10 is shown in FIG. 13. In a manner similar to above even in the same figure, a source (Gr.I) timing signal indicated by solid lines comprises XP1 defined as a control signal and a timing signal N1 defined as a regenerative signal. As distinct from FIG. 12, a method for performing switching between pairs (Gr.I) and (Gr.II) of drive signals, according to the present embodiment switches the pairs of drive signals, respectively, on the basis of both edges decisions corresponding to current polarity determination at an edge at which a drive voltage changes from a high level to a low level and current polarity determination at an edge at which the drive voltage changes from a low level to a high level. In both edges determination type such as described in the present embodiment, the drive signal is divided into the two of the first half and the latter half on the rising and falling sides by an A/XB signal to perform switching of the pairs of drive signals independently respectively.

That is, the falling side of the drive signal is temporarily switched from (Gr.I) to (Gr.II) according to a change of a signal BP to a low level. Since a signal AP is still high in level, the pair is returned from (Gr.II) to (Gr.I) on the rising side of the drive signal and changed from (Gr.I) to (Gr.II) according to the low level of the signal BP again. Thereafter, the signal AP is brought to a low level and hence (Gr.II) remains selected although not shown in the drawing. Incidentally, since the pair of drive signals is switched and corrected after an error has occurred once, even in the present embodiment, the pair of drive signals is switched to a suitable pair free of the occurrence of an error, and thereafter the present pair of drive signals is maintained during PWM cycles corresponding to a predetermined of number of times, which are held in a latch and defined in advance.

In the embodiment shown in FIG. 13, the current polarity can be determined at both edges of PWM independently. Therefore, the number of times that an error occurs, can be minimized in the case of such a relatively slow switching of current polarity that driving of the signal for the current source and the pair for the current sink is repeated every PWM edges (half cycles). The selection of either the single edge determination type of FIG. 12 or the both edges detection type of FIG. 13 may be performed suitably depending on an intended motor.

Figure 14:
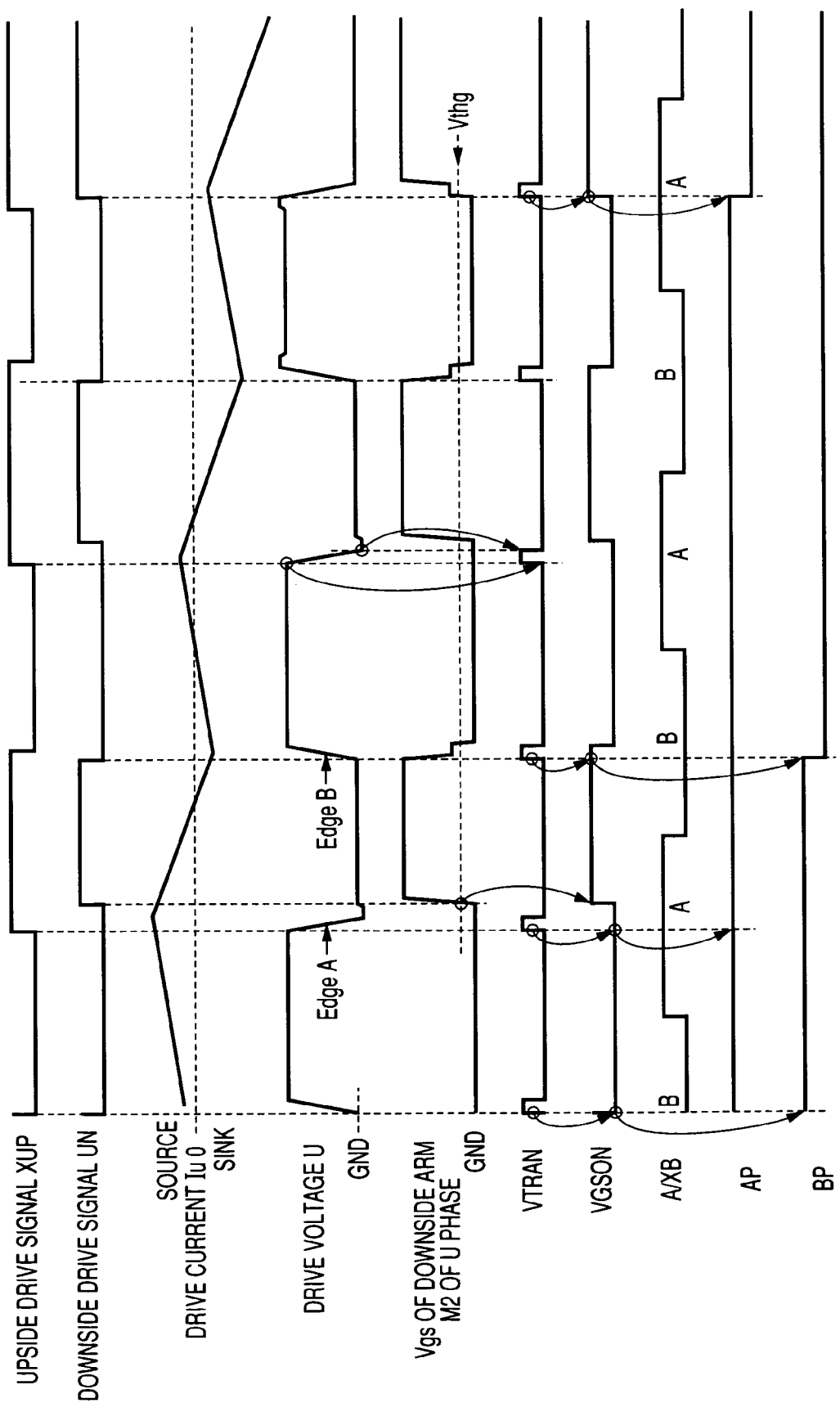
FIG. 14 is a timing diagram for describing one example of the operation of a current polarity detection unit in FIG. 10.

A timing diagram for describing one example of the current polarity detector shown in FIG. 10 is shown in FIG. 14. A U phase is illustratively shown as typical in the same figure. Other V and W phases are also similar to above. A drive voltage U is determined depending on output levels of an upside drive signal XUP and a downside drive signal UN shown in the same figure and the polarity of a drive current Iu. However, the gate-to-source voltage Vgs of the downside arm driving power MOSFET M2 at this time is shown like the center of the same figure. A signal VGSON for determining either one of an on state and an off state of the MOSFET M2 is generated by determining the gate-to-source voltage Vgs of the MOSFET M2 by means of a comparator. When the drive current Iu is now in a source state, VGSON=low level is reached. When the current Iu is in a sink state, VGSON=high level is reached. A comparator threshold value or voltage Vthg is set slightly lower than a threshold value or voltage Vth of the power MOSFET M2.

A timing signal VTRAN corresponding to a transition period of the drive voltage U is generated by a window comparator having a suitable threshold value or voltage. The outputs of an A-side polarity determination signal AP and a B-side polarity determination signal BP are triggered with timing of the rising edge of the timing signal VTRAN and given as signals obtained by inverting the level of VGSON at the same timing. However, when an edge selection signal A/XB=high level, only the AP output changes, whereas when the edge selection signal A/XB=low level, only the BP output changes. Both the A-side polarity determination signal and the B-side polarity determination signal show that their high levels respectively indicate a source state of the drive current Iu and their low levels respectively indicate a sink state of the drive current Iu.

Figure 15:
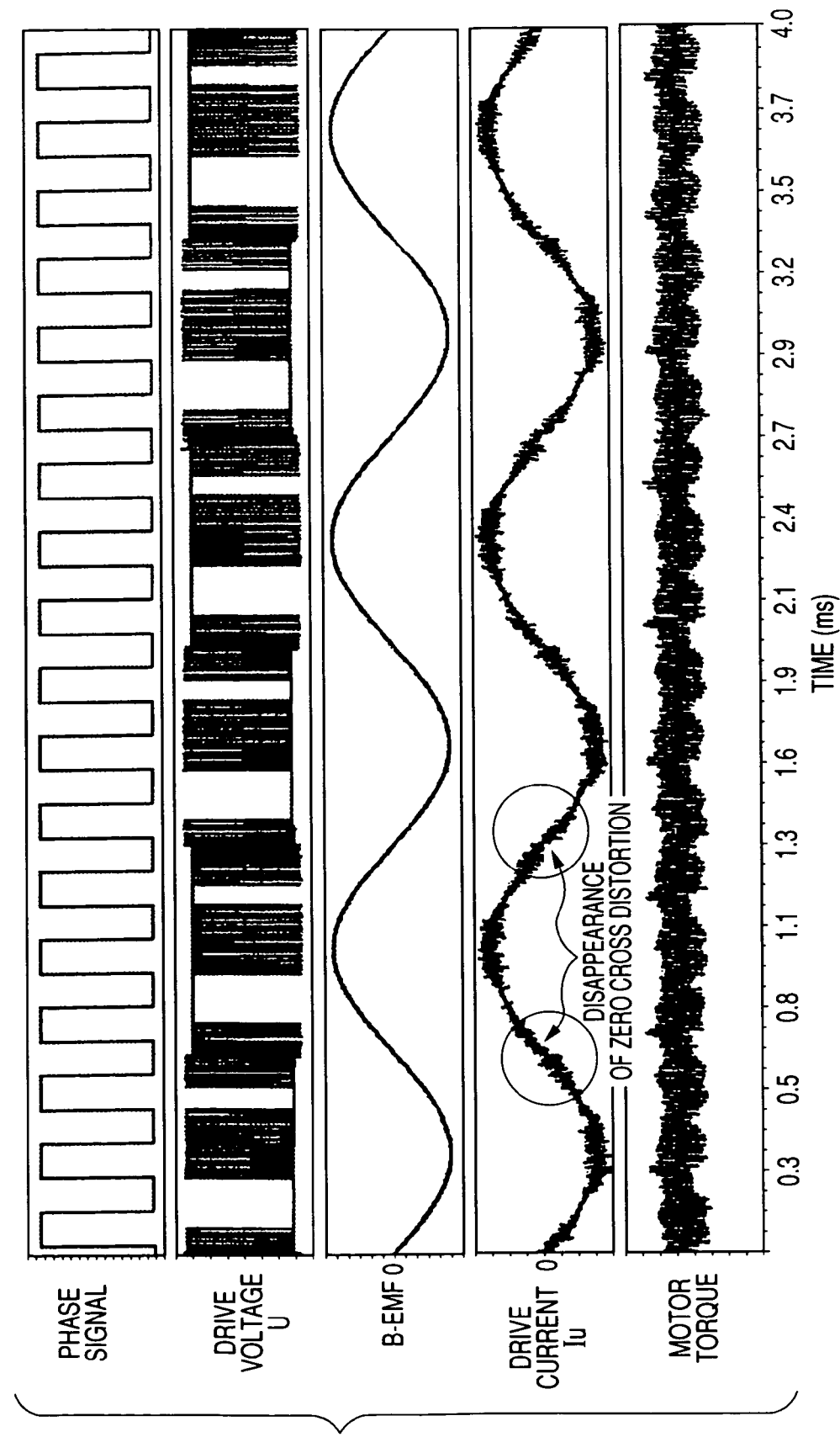
FIG. 15 is a simulation waveform diagram showing typical signals of the motor drive device shown in FIG. 10.
Figure 16:
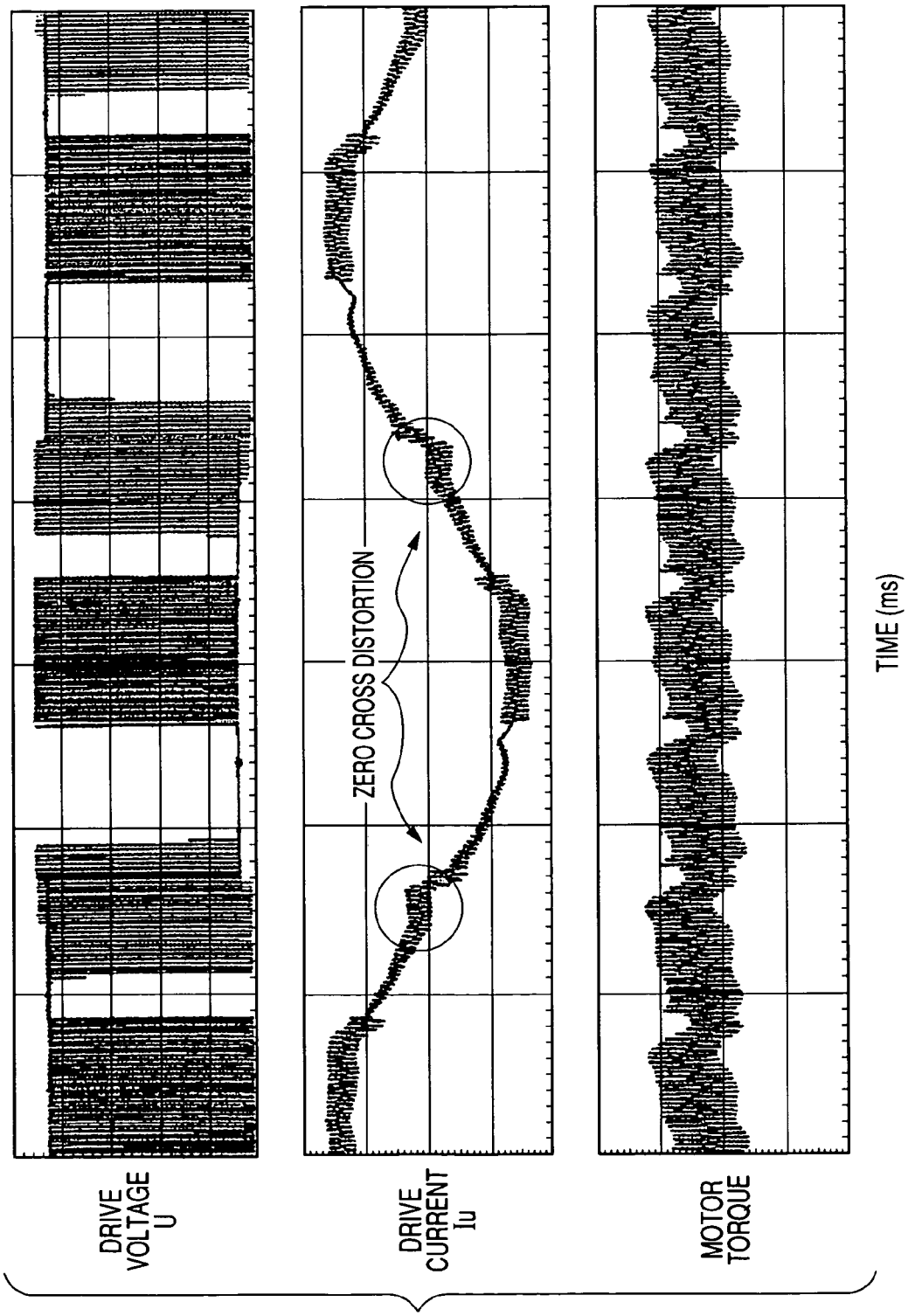
FIG. 16 is a simulation waveform diagram associated with FIG. 11.

A simulation waveform diagram illustrative of typical signals obtained by the motor drive device shown in FIG. 10 is shown in FIG. 15. In a drive current Iu, as shown in the same figure, zero cross distortion disappears and correspondingly a variation in torque also becomes small. A simulation waveform diagram shown for contrast with the invention of the present application is shown in FIG. 16 and illustrated as an example in which when the direction in which each dead time is given in the vicinity of switching of current polarity at the three-phase motor as shown in FIG. 11 is inappropriate, zero cross distortion occurs so that ripples increase in motor torque.

Figure 17:
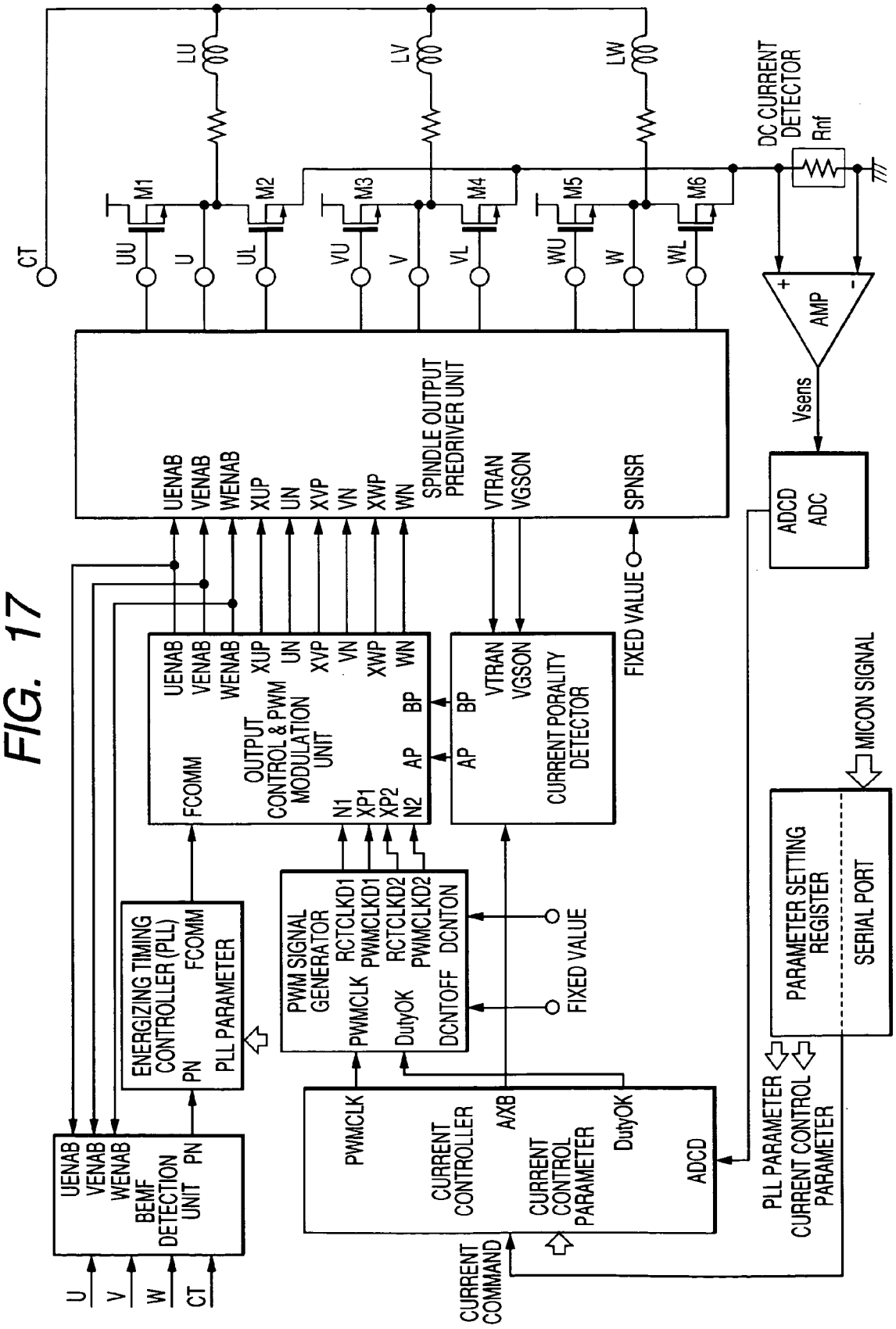
FIG. 17 is a block diagram showing a further embodiment of a motor drive device according to the present invention.

A block diagram of a further embodiment of a motor drive device according to the present invention is shown in FIG. 17. The present embodiment is of a modification of the embodiment shown in FIG. 10. The switching characteristic adjustment unit is omitted. In the present embodiment, signals DCNTON, DCNTOFF and SPNSR comprising fixed values are given as dead times. That is, the dead times are set with a predetermined margin having taken into consideration device's characteristic variations. Even under such dead times, zero cross distortion disappears in a drive current Iu and correspondingly variations in torque can also be reduced.

In the embodiments shown in FIGS. 10 and 17, the signals on the control and regeneration sides are supplied to the driver circuit as a result of determination of the polarities of currents flowing through the motor coils for the respective phases. Therefore, the motor coils can always be driven with PWM duty indicative of the same duty as the control signal of PWM, thereby enabling high-accuracy PWM driving. When a DC brushless motor is driven by sine wave currents, sinusoidal driving hard to cause zero cross distortion in each phase coil current can be realized, thereby bringing about the advantages that torque ripples are reduced and lower-noise motor driving is enabled. Vibrations produced in the motor due to such a reduction in motor's torque ripple are reduced and a read margin from the magnetic disk or the like driven thereby can be increased. The present PWM driving method is effective even for such a VCM driver that the accuracy in the vicinity of current's zero cross becomes important.

While the invention made above by the present inventors has been described specifically based on the illustrated embodiments, the present invention is not limited to the embodiments. Various changes can be made thereto within the scope not departing from the gist thereof. For example, the means for measuring the switching time and the means for determining the on/off state of each power MOSFET may be configured of other means employed in the above embodiments. The control signal and the regenerative signal may directly be generated using the result of current polarity by the current controller without generating and selecting the two types of signals from the PWMCLK generated at the current controller. This can be easily realized if the on time of PWM is switched according to the current polarity. The present invention can widely be used as a motor drive device and a motor drive integrated circuit.

What is claimed is:

1. A motor drive device comprising:
    an output stage comprising an upside power MOSFET, a downside power MOSFET and a spindle output predriver unit, said output stage driving a multiphase DC motor;
    a current detector for detecting a current made to flow through the multiphase DC motor;
    a current controller which outputs a PWM signal desired in such a manner that a current instruction signal and the current detected by the current detector coincide with each other;
    a PWM signal generator which generates a regenerative signal obtained by giving, to the PWM signal, dead times for avoiding simultaneous turning on of the upside power MOSFET and the downside power MOSFET for applying voltages of respective phases to the multiphase DC motor;
    a phase detection unit for detecting each rotational phase of the multiphase DC motor;
    an energizing timing controller which generates an energizing timing signal from a detection result of the phase detection unit;
    an output control & PWM modulation unit which generates signals for controlling on/off of the upside power MOSFET and the downside power MOSFET from the energizing timing signal and an output signal of the PWM signal generator; and
    a switching characteristic adjustment unit which measures a time at which the output stage is being transitioned and performs such feedback control that the time and a switching time designated coincide with each other.

2. The motor drive device according to claim 1, further comprising:
    an AD converter which converts the current detected by the current detector to a digital value; and
    a serial port having a parameter setting register for setting parameters including data in connection with the current instruction signal and the switching time.

3. The motor drive device according to claim 2, wherein the switching characteristic adjustment unit allows a time at which a spindle output is being transitioned to coincide with the switching time designated by operating a current source for forming a drive signal transferred to a gate of the upside power MOSFET or the downside power MOSFET by the spindle output predriver unit as a variable current source in accordance with a feedback control.

4. The motor drive device according to claim 3, wherein the switching characteristic adjustment unit executes a comparison operation for comparing a count value of a counter for counting the time at which the spindle output is being transitioned, with an input value of a register inputted with the switching time designated and controls a current value of the variable current source according to a result of the comparison result.

5. The motor drive device according to claim 4, wherein the time at which the spindle output is being transitioned is defined as a time at which the gate voltage of the upside power MOSFET or the downside power MOSFET falls within a specific range.

6. The motor drive device according to claim 3, wherein the switching characteristic adjustment unit forms the time at which the spindle output is being transitioned, as a voltage formed by an integration circuit.

7. The motor drive device according to claim 1, wherein the spindle output predriver unit of the output stage and the switching characteristic adjustment unit are configured by one semiconductor integrated circuit device.

8. The motor drive device according to claim 7, wherein each of the power MOSFETs of the output stage comprises a semiconductor integrated circuit device different from the semiconductor integrated circuit device containing the switching characteristic adjustment unit, or a single element.

9. A motor drive device comprising:
    an output stage comprising an upside power MOSFET, a downside power MOSFET and a spindle output predriver unit, said output stage driving a multiphase DC motor;
    a current detector for detecting a current made to flow through the multiphase DC motor;
    a current controller which outputs a PWM signal desired in such a manner that a current instruction signal and the current detected by the current detector coincide with each other;
    a PWM signal generator which generates a regenerative signal obtained by giving, to the PWM signal, dead times for avoiding simultaneous turning on of the upside power MOSFET and the downside power MOSFET for applying voltages of respective phases to the multiphase DC motor;
    a phase detection unit for detecting each rotational phase of the multiphase DC motor;
    an energizing timing controller which generates an energizing timing signal from a detection result of the phase detection unit;
    an output control & PWM modulation unit which generates signals for controlling on/off of the upside power MOSFET and the downside power MOSFET from the energizing timing signal and an output signal of the PWM signal generator; and
    a switching characteristic adjustment unit which generates the dead times for on/off-controlling of one of a pair of power MOSFETs comprising the upside and downside in order to avoid simultaneous turning on of the pair of power MOSFETs in a next PWM cycle from a signal which determines on/off based on a gate-tosource voltage of the other of the pair of power MOSFETs and a signal for controlling on/off of such power MOSFETs.

10. The motor drive device according to claim 9, wherein the time at which the spindle output is being transitioned is counted by a first counter to form a first count value, the time from a signal for instructing off of the other of the pair of power MOSFETs to the output of a signal determined to be off based on the gate-to-source voltage thereof, is counted by a second counter to form a second count value, and the time for transition of on/off of the one MOSFET is estimated from the first count value and the second count value to thereby generate the dead times.

11. The motor drive device according to claim 9, wherein the time for transition of on/off is counted by the first counter from the gate-to-source voltage of the one of the pair of power MOSFETs to form a first count value, the time from a signal for instructing off of the one power MOSFET to the output of a signal determined to be off based on the gate-to-source voltage thereof is counted by the second counter to form a second count value, and the time for transition of on/off of the other MOSFET is estimated from the first count value and the second count value to thereby generate the dead times.

12. The motor drive device according to claim 9,
wherein the switching characteristic adjustment unit further includes such a feedback controller that the first count value and a designated switching time coincide with each other, and
wherein the spindle output predriver unit causes a current source that forms a drive signal transferred to the gate of the corresponding power MOSFET to be operated as a variable current source controlled by the feedback controller, thereby causing the time at which the spindle output is being transitioned to coincide with the designated switching time.

13. The motor drive device according to claim 12, wherein the switching characteristic adjustment unit compares the first count value with an input value of a register inputted with the designated switching time and controls a current value of the variable current source according to the result of comparison.

14. A motor drive device comprising:
an output stage which drives a multiphase DC motor including an upside power MOSFET, a downside power MOSFET;
a current detector for detecting a current made to flow through the multiphase DC motor;
a current controller which outputs a PWM signal desired in such a manner that a current instruction signal and the current detected by the current detector coincide with each other;
a PWM signal generator which generates a regenerative signal obtained by giving, to the PWM signal, dead times for avoiding simultaneous turning on of the upside power MOSFET and the downside power MOSFET for applying voltages of respective phases to the multiphase DC motor;
a phase detection unit for detecting each rotational phase of the multiphase DC motor;
an energizing timing controller which generates an energizing timing signal from a detection result of the phase detection unit;
an output control & PWM modulation unit which generates signals for controlling on/off of the upside power MOSFET and the downside power MOSFET from the energizing timing signal and an output signal of the PWM signal generator; and a current polarity detector which detects that a direction of a current that flows from the output stage to a motor coil is source or sink,
wherein the output control & PWM modulation unit assigns a dead time to a drive signal of a power MOSFET configured as the regeneration side, of the upside power MOSFET and the downside power MOSFET constituting the output stage in association with a detection signal of the current polarity detector.

15. The motor drive device according to claim 14,
wherein when the direction of the current flowing from the output stage to a motor coil is source and sink, the PWM signal generator generates two timing signals corresponding to each of the direction and transfers the two timing signals to the output control & PWM modulation unit, and
wherein the output control & PWM modulation unit selects any one of the two timing signals in response to the detection signal sent from the current polarity detector to form the drive signal.

16. The motor drive device according to claim 15, wherein the current polarity detector retains a current polarity determination result at an edge at which switching of a drive current is reached ahead, in a latch and uses the same for selection of the timing signal at or under current polarity determination corresponding to any one of polarity determination at an edge at which an output voltage changes from a high level to a low level and polarity determination at an edge at which the output voltage changes from a low level to a high level.

17. The motor drive device according to claim 15, wherein the current polarity detector retains current polarity determination results of both polarity determination at an edge at which an output voltage changes from a high level to a low level and polarity determination at an edge at which the output voltage changes from a low level to a high level, in latches respectively and uses the same for selection of the timing signal.

18. A motor drive device comprising:
an output stage comprising an upside power MOSFET, a downside power MOSFET and a spindle output predriver unit, said output stage driving a multiphase DC motor;
a current detector for detecting a current made to flow through the multiphase DC motor;
a current controller which outputs a PWM signal desired in such a manner that a current instruction signal and the current detected by the current detector coincide with each other;
a PWM signal generator which generates a regenerative signal obtained by giving, to the PWM signal, dead times for avoiding simultaneous turning on of the upside power MOSFET and the downside power MOSFET for applying voltages of respective phases to the multiphase DC motor;
a phase detection unit for detecting each rotational phase of the multiphase DC motor;
an energizing timing controller which generates an energizing timing signal from a detection result of the phase detection unit;
an output control & PWM modulation unit which generates signals for controlling on/off of the upside power MOSFET and the downside power MOSFET from the energizing timing signal and an output signal of the PWM signal generator;
a switching characteristic adjustment unit which measures a time at which the output stage is being transitioned and performs such feedback control that the time and a switching time designated coincide with each other; and a current polarity detector which detects whether a direction of a current that flows from the output stage to a motor coil is either source or sink, wherein the output control & PWM modulation unit assigns a dead time to a drive signal of a power MOSFET configured as the regeneration side, of the upside power MOSFET and the downside power MOSFET constituting the output stage in association with a detection signal of the current polarity detector.

19. The motor drive device according to claim 18, wherein when the direction of the current flowing from the output stage to a motor coil is source and sink, the PWM signal generator generates two timing signals corresponding to each of the direction and transfers the two timing signals to the output control & PWM modulation unit, and wherein the output control & PWM modulation unit selects any one of the two timing signals in response to the detection signal sent from the current polarity detector to form the drive signal.

20. A motor drive device comprising:

an output stage comprising an upside power MOSFET, a downside power MOSFET and a spindle output pre-driver unit, said output stage driving a multiphase DC motor;

a current detector for detecting a current made to flow through the multiphase DC motor;

a current controller which outputs a PWM signal desired in such a manner that a current instruction signal and the current detected by the current detector coincide with each other;

a PWM signal generator which generates a regenerative signal obtained by giving, to the PWM signal, dead times for avoiding simultaneous turning on of the upside power MOSFET and the downside power MOSFET for applying voltages of respective phases to the multiphase DC motor;

a phase detection unit for detecting each rotational phase of the multiphase DC motor;

an energizing timing controller which generates an energizing timing signal from a detection result of the phase detection unit;

an output control & PWM modulation unit which generates signals for controlling on/off of the upside power MOSFET and the downside power MOSFET from the energizing timing signal and an output signal of the PWM signal generator;

a switching characteristic adjustment unit which generates the dead times for on/off-controlling of one of a pair of power MOSFETs comprising the upside and downside in order to avoid simultaneous turning on of the pair of power MOSFETs in a next PWM cycle from a signal which determines on/off based on a gate-to-source voltage of the other of the pair of power MOSFETs and a signal for controlling on/off of such power MOSFETs; and a current polarity detector which detects whether a direction of a current that flows from the output stage to a motor coil is either source or sink, wherein the output control & PWM modulation unit assigns a dead time to a drive signal of a power MOSFET configured as the regeneration side, of the upside power MOSFET and the downside power MOSFET constituting the output stage in association with a detection signal of the current polarity detector.

* * * * *